US012664539B2

(12) United States Patent
Mancuso et al.

(10) Patent No.: US 12,664,539 B2
(45) Date of Patent: Jun. 23, 2026

(54) GENERATING AND MANAGING TOKENIZED ASSETS UTILIZING BLOCKCHAIN MINTING AND A DIGITAL PASSPORT

(71) Applicant: Dropbox, Inc., San Francisco, CA (US)

(72) Inventors: Devin Mancuso, San Francisco, CA (US); Eric Alves, New York City, NY (US); Austin Adams, Austin, TX (US); Kris Puckett, Denver, CO (US); Willa Peng, Everett, WA (US); Arunsunai Anbukarasi Anbalagapandian, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 175 days.

(21) Appl. No.: 17/804,984

(22) Filed: Jun. 1, 2022

(65) Prior Publication Data

US 2023/0394470 A1     Dec. 7, 2023

(51) Int. Cl.
*G06Q 20/36*      (2012.01)
*H04L 9/00*      (2022.01)
*H04L 9/32*      (2006.01)

(52) U.S. Cl.
CPC ....... *G06Q 20/3674* (2013.01); *H04L 9/3213* (2013.01); *H04L 9/50* (2022.05); *H04L 2209/56* (2013.01); *H04L 2209/60* (2013.01)

(58) Field of Classification Search
None
See application file for complete search history.

(56) References Cited

U.S. PATENT DOCUMENTS

| | | | |
|---|---|---|---|
| 12,176,097 B2 * | 12/2024 | Fairless | H04L 9/3239 |
| 2014/0114808 A1 * | 4/2014 | Bachman | G06Q 30/0623 |
| | | | 705/26.61 |
| 2019/0303926 A1 | 10/2019 | Yantis et al. | |
| 2020/0175485 A1 | 6/2020 | Knock | |
| 2021/0279305 A1 * | 9/2021 | Goldston | G06F 16/41 |
| 2021/0357542 A1 | 11/2021 | Bowen et al. | |
| 2021/0383461 A1 | 12/2021 | Andon et al. | |

(Continued)

FOREIGN PATENT DOCUMENTS

WO      WO-2022018433 A1      1/2022

OTHER PUBLICATIONS

International Search Report and Written Opinion for Application No. PCT/US2023/064931 mailed on Aug. 28, 2023, 13 pages.
(Continued)

*Primary Examiner* — Duan Zhang
*Assistant Examiner* — Nicholas K Phan
(74) *Attorney, Agent, or Firm* — Keller Preece PLLC

(57) ABSTRACT
The present disclosure is directed toward systems, methods, and non-transitory computer readable media for generating and maintaining tokenized assets associated with a user account of a content management system. In particular, the disclosed systems can facilitate generating tokenized assets from content items within a content management system. In addition, the disclosed systems can identify tokenized assets associated with a user account within a content management system for facilitating access to gated content. For example, the disclosed systems can generate and provide a digital passport that serves as a centralized location for accessing and managing tokenized assets associated with a user account.

20 Claims, 23 Drawing Sheets

(56) References Cited

U.S. PATENT DOCUMENTS

| | | | | |
|---|---|---|---|---|
| 2022/0016529 | A1* | 1/2022 | Meilich | H04L 63/123 |
| 2022/0067710 | A1 | 3/2022 | Yantis et al. | |
| 2022/0075845 | A1 | 3/2022 | Bowen et al. | |
| 2022/0270084 | A1 | 8/2022 | Xue et al. | |
| 2022/0270421 | A1 | 8/2022 | Carter | |
| 2022/0337898 | A1 | 10/2022 | Dorogusker et al. | |
| 2022/0391888 | A1 | 12/2022 | Kim | |
| 2023/0103486 | A1* | 4/2023 | Nilsson | G06F 16/951 |
| | | | | 726/26 |
| 2023/0147339 | A1* | 5/2023 | Kidakarn | H04L 9/3213 |
| | | | | 345/156 |
| 2023/0376557 | A1* | 11/2023 | Mancuso | G06F 3/04842 |
| 2024/0095857 | A1 | 3/2024 | Foote et al. | |

OTHER PUBLICATIONS

Invitation to Pay Additional Fees for International Application No. PCT/US2023/064931 mailed Jul. 5, 2023, 8 pages.

Non-Final Office Action from U.S. Appl. No. 17/804,981, mailed May 15, 2024, 28 pages.

"OpenSea.io," 2022 [Retrieved on May 4, 2024], 16 pages, Retrieved from Wayback Machine: https://web.archive.org/web/20220531070951/https://opensea.io/collection/goblintownwtf and https://web.archive.org/web/20220531233058/https://opensea.io/.

"Transitnet.io," 2022 [Retrieved on May 4, 2024], 5 pages, Retrieved from Wayback Machine: https://web.archive.org/web/20220217193737/https://transitnet.io/blog/can-you-prove-that-you-own-your-crypto-assets/.

Egan J., "Is There Any Way To Stop Youtube Syncing Search History And Video History Between My Devices," Google, Nov. 2, 2019, 2 pages, Retrieved from the Internet URL: https://support.google.com/android/thread/18421203/is-there-any-way-to-stop-youtube-syncing-search-history-and-video-history-between-my-deviceshl=en.

Final Office Action from U.S. Appl. No. 17/804,981 mailed Sep. 20, 2024, 23 pages.

Non-Final Office Action from U.S. Appl. No. 17/804,981, mailed Nov. 20, 2024, 22 pages.

International Preliminary Report on Patentability for PCT Application No. PCT/US2023/064931, dated Dec. 12, 2024, 9 pages.

Notice of Allowance for U.S. Appl. No. 17/804,981 mailed on Jun. 27, 2025, 8 pages.

Notice of Allowance for U.S. Appl. No. 17/804,981 mailed on Mar. 19, 2025, 11 pages.

* cited by examiner

1500

1510
Identifying Content Items Associated With A User Account

1520
Determining Content Items To Include Within A Tokenized Asset Minted On A Blockchain 1530
Generating A Visual Representation Of The Tokenized Asset 1540
Providing The Visual Representation For Display On A Client Device

1600

Identifying Tokenized Assets Associated With A User Account
1610

Receiving A Request To Access A Gated Content Item
1620

Determining That The User Account Is Associated With A Tokenized Asset For The Gated Content Item
1630

1800

GENERATING AND MANAGING TOKENIZED ASSETS UTILIZING BLOCKCHAIN MINTING AND A DIGITAL PASSPORT

BACKGROUND

Advancements in computing devices and networking technology have led to a variety of innovations in providing digital content to, and sharing digital content among, user accounts. In addition, recent years have seen significant advancements in hardware and software platforms for blockchain technology that includes managing distributed ledger databases across networks of computing devices. Indeed, so-called "blockchain" systems can manage a consensus ledger via a network of entities distributed throughout the world and without a central entity that can be corrupted or otherwise manipulated to undermine the security and performance of the digital ledger. Despite these advances, however, existing digital content systems continue to suffer from a number of disadvantages, particularly in terms of security, efficiency, and flexibility.

As just suggested, some existing digital content systems are insecure. In particular, existing digital content systems often risk overexposure of sensitive information such as blockchain keys and tokenized asset data stored within a blockchain. Indeed, due to their compartmentalized nature, existing systems often require several different interfaces, platforms, and/or applications for managing tokenized assets (e.g., different types of tokenized asset and/or tokenized assets on different blockchains). As the number of interfaces, platforms, and/or applications increases, the number of (potential) exposures also increases, as each of these different platforms accesses and/or stores sensitive data such as blockchain keys and/or tokenized assets.

As an additional insecurity, digital content maintained by existing digital content systems is often vulnerable to inadvertent data loss and/or to malicious actors. To elaborate, some existing systems inadequately protect individual digital content items or fail to do so at all. Consequently, these systems risk damage or loss of digital content items, which is especially problematic for sensitive or valuable content items.

In addition, some existing digital content systems are inflexible. Specifically, some existing systems provide options for generating and managing tokenized assets as part of a blockchain. However, many existing systems are rigidly fixed to their respective domains (e.g., tokenized asset management) and are therefore limited in their access to digital content for converting into tokenized assets. Accordingly, existing systems often require users to utilize multiple applications, websites, or interfaces to perform tokenized asset minting and management.

Due at least in part to their inflexible nature, many existing digital content systems inefficiently utilize computing resources, such as processing power and memory. Particularly, existing systems often generate and provide inefficient graphical user interfaces that require an excessive number of user interactions to access certain data and functionality. Indeed, many existing systems require navigating back and forth between many different applications or interfaces to identify content items within a content management system and to generate and manage tokenized assets relating to the content items within a tokenized asset system. Navigating through these large numbers of layers of interfaces and applications consumes excessive amounts of computing resources that could otherwise be preserved with more efficient user interfaces.

Further contributing to their inefficiency, existing systems are often compartmentalized or fragmented in their approaches to gating access to digital content. For instance, existing systems often gate digital content by requiring a user account to own or otherwise be associated with a tokenized asset to access the digital content. However, existing techniques for granting access to digital content gated using tokenized gating are fragmented, frequently requiring client devices to locate specific tokenized assets from their own respective tokenized asset systems and to further provide the tokenized assets to a digital content system to gain access to the gated content. Indeed, in many existing systems, there is no solution for more seamlessly bridging the gap between content systems and tokenized asset systems for accessing gated content using different tokenized asset systems and/or different types of tokenized assets. By requiring such onerous navigation, existing systems often require excessive user interactions (and computing resources for processing the user interactions) for accessing gated digital content across various platforms, networks, marketplaces, and/or blockchains.

Thus, there are several disadvantages with regard to existing digital content systems.

SUMMARY

This disclosure describes one or more embodiments of systems, methods, and non-transitory computer readable storage media that provide benefits and/or solve one or more of the foregoing and other problems in the art. For instance, the disclosed systems can facilitate generating tokenized assets (either directly or via a third party system) from content items within a content management system that stores content items for user accounts in a cloud-based remote network. To this end, the disclosed systems can determine content items to include within a tokenized asset from a content management system. In particular, the disclosed systems can select one or more content items associated with a user account within a content management system. The disclosed systems can further mint (or cause to be minted) a tokenized asset from the one or more selected content items using a blockchain and a blockchain key associated with the user account.

In addition, the disclosed systems can identify tokenized assets associated with a user account within a content management system for facilitating access to gated content. In some cases, the disclosed systems can generate and provide a digital passport that serves as a centralized location for accessing and managing tokenized assets associated with a user account. For example, the disclosed systems generate a digital passport for a user account of a digital content management system by identifying tokenized assets (of different types and/or across different platforms and/or from different blockchains) associated with the user account and grouping links to the tokenized assets into a single collection. In some embodiments, the disclosed systems provide various passport interfaces for managing different aspects of the digital passport, including the tokenized assets. In addition, the disclosed systems can provide access to gated content (e.g., a tokenized gate access content item) by (automatically) verifying that a user account requesting access is associated with a tokenized asset that permits access to the gated content (e.g., by checking a digital passport associated with the user account).

Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
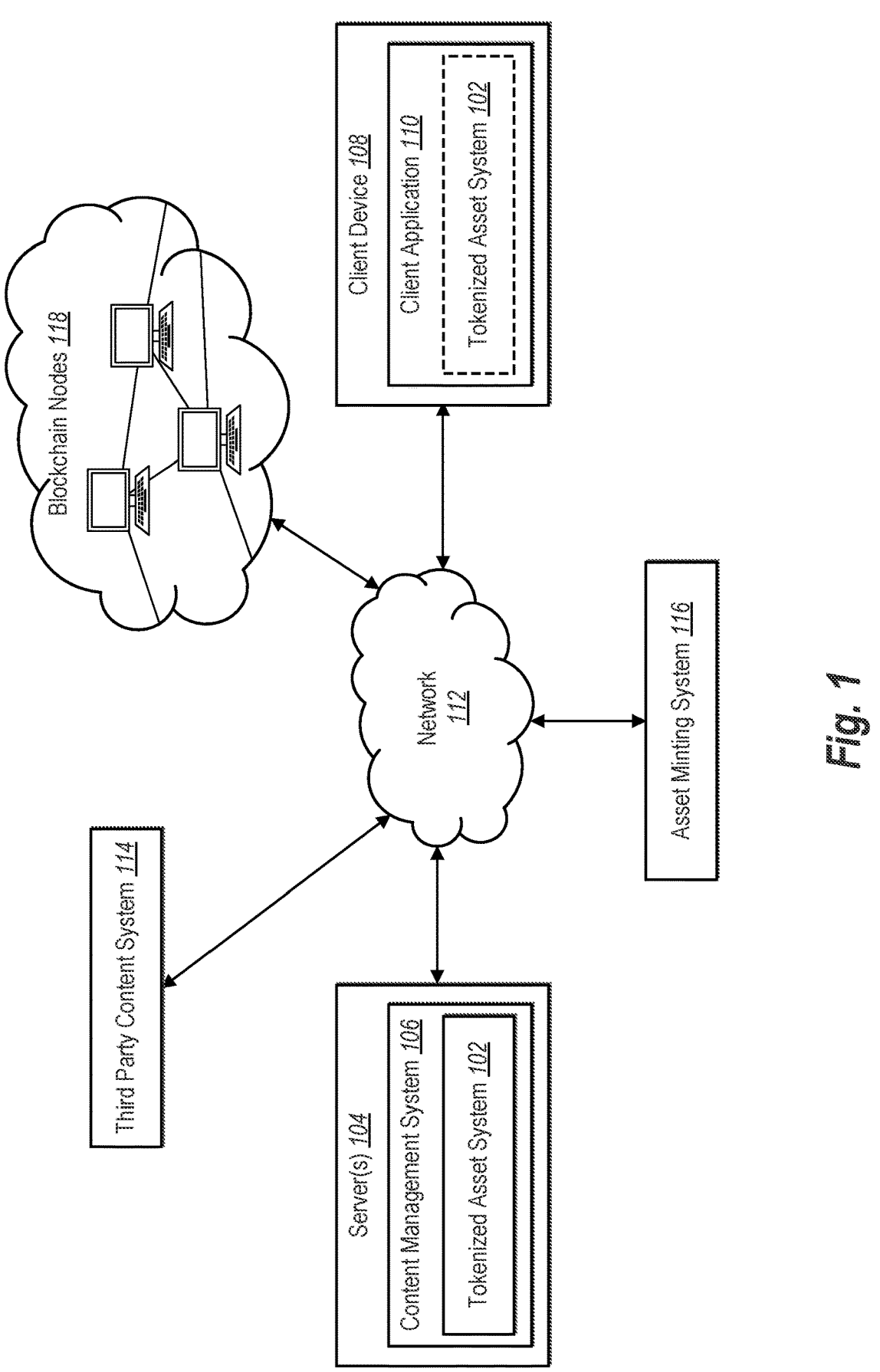
FIG. 1 illustrates a schematic diagram of an example environment of a tokenized asset system in accordance with one or more embodiments.

This disclosure describes one or more embodiments of a tokenized asset system that can intelligently manage and generate tokenized assets associated with a user account of a content management system. The tokenized asset system can provide a unified environment that incorporates functionality for managing content items, generating tokenized assets from the content items, and utilizing the generated tokenized assets (e.g., to access gated content) within the same content management system or within a third party content system. For example, the tokenized asset system can generate a tokenized asset by identifying content items associated with a user account to include in a tokenized asset and causing the tokenized asset to be minted on a blockchain to reflect the data of the content items. In some embodiments, the tokenized asset system can generate and manage a digital passport as a centralized location for consolidating and managing tokenized assets associated with a user account of a content management system. For example, the tokenized asset system can identify tokenized assets associated with the user account and can group links to the tokenized assets into a single passport interface for quick, efficient access.

Brief Explanation of Generating Tokenized Assets

As just mentioned, the tokenized asset system can generate tokenized assets for a user account of a content management system. To elaborate, the tokenized asset system can identify content items to include within a tokenized asset. For instance, the tokenized asset system identifies content items stored within one or more databases (e.g., cloud-based network databases) of a content management system and associated with (or owned by) a user account of the content management system. The tokenized asset system can further mint (or cause to be minted) a tokenized asset (e.g., a nonfungible token or "NFT" or some other tokenized asset based on a blockchain or otherwise) from one or more of the content items associated with the user account.

In some embodiments, the tokenized asset system can generate a tokenized asset from a single content item or from multiple content items (e.g., for a combined tokenized asset or a composite tokenized asset). In some embodiments, the tokenized asset system provides content items to include with a tokenized asset to an asset minting system for minting the tokenized asset by converting the content items into a tokenized asset stored on a blockchain and associated with the user account. For instance, the tokenized asset system causes the asset minting service to generate and store one or more smart contracts corresponding to the content items (e.g., indicating storage locations of the content items and signed by a blockchain key associated with the user account) within a blockchain. In certain embodiments, the tokenized asset system performs the minting process by converting the content items into tokenized content stored on a blockchain and associated with the user account without using a third party asset minting system. In some cases, the tokenized asset system mints (or causes to be minted) the tokenized asset upon creation by a user account (e.g., selection of a "mint" option to generate a tokenized asset from one or more content items), while in other cases the tokenized asset system postpones minting until a purchase event, as described in further detail below.

In one or more embodiments, the tokenized asset system generates and provides a visual representation of a tokenized asset for display on a client device associated with a user account. For example, the tokenized asset system can generate a visual representation (before or after minting actually takes place) to provide for display on a client device. In addition, the tokenized asset system can determine, and provide for display, tokenized asset data including ownership information, creator information, a ledger history, and/or a storage location indicator. In some cases, the tokenized asset system identifies a new tokenized asset added to a collection or a folder within a content management system, and the tokenized asset system renders (or causes a client device to render) the tokenized asset in a particular visual format to reflect the visual representation along with the corresponding tokenized asset data.

In some embodiments, the tokenized asset system can provide a tokenized asset for purchase. For example, the tokenized asset system can provide a tokenized asset marketplace for user accounts to purchase the tokenized asset, where the tokenized asset marketplace is within (or integrated with) a content management system. As another example, the tokenized asset system can provide a tokenized asset for purchase via a third party tokenized asset marketplace separate from a content management system. Additional detail regarding generating a tokenized asset, determining tokenized asset data, and providing a tokenized asset for purchase is provided below with reference to the figures.
Brief Explanation of Digital Passports and Gating As mentioned above, the tokenized asset system can manage tokenized assets associated with a user account within a content management system, particularly for accessing gated content. For example, the tokenized asset system can identify tokenized assets associated with a user account utilizing a content management system as a centralized source for accessing gated content (or otherwise using, transferring, or purchasing tokenized assets). In certain cases, the tokenized asset system can communicate from a content management system to other platforms and systems to provide indications of tokenized assets associated with the user account and/or for other uses such as transfers and purchases.

In some embodiments, the tokenized asset system can generate a digital passport for managing tokenized assets of a user account within a content management system. To elaborate, the tokenized asset system can generate a digital passport that includes tokenized assets such as NFTs, cryptocurrencies, and/or tokenized passes. In some cases, the tokenized asset system generates a digital passport in the form of a specialized user interface (or a specialized portion or window within a user interface) that consolidates different tokenized assets into a single, centralized location for quick, efficient access, management, distribution, and use of the tokenized assets.

To generate a digital passport, in some embodiments the tokenized asset system generates or identifies links to blockchain locations (or to locations of a blockchain block explorer) for tokenized asset system associated with a user account. For instance, the tokenized asset system generates links to tokenized assets of different types, from different platforms, and/or from different blockchains. The tokenized asset system can further group the links into a collection within a passport interface, including indications of tokenized asset data such as ownership information and smart contract addresses indicated by the links. In some cases, the passport interface includes options to perform various functions such as: i) viewing and managing the various tokenized assets within the passport, ii) viewing and managing a data stream of internet activity from creators (or other user accounts) associated with the tokenized assets within the passport, iii) viewing and managing content items and/or other user accounts connected via one or more tokenized assets to the user account corresponding to the passport, and iv) viewing and managing tokenized asset activity such as historical purchases and transfers of tokenized assets and/or related content items.

In some embodiments, the tokenized asset system facilitates access to gated content utilizing a digital passport. More specifically, the tokenized asset system can identify a tokenized gate access content item that requires a particular tokenized asset (or multiple tokenized gate access content items) to access (e.g., view or otherwise consume) the content item. The tokenized asset system can receive a request to access the tokenized gate access content item (e.g., from a client device or from a third party content system) and can determine whether the digital passport of the user account requesting access includes a tokenized asset that would permit such access. In certain cases, the tokenized asset system permits access to the tokenized gate access content item by granting viewing (or other consumption) privileges directly within a content management system or by providing an indication to a third party content system hosting the tokenized gate access content item that the user account is permitted to access the content. Additional detail regarding the digital passport and accessing tokenized gate access content items is provided below with reference to the figures.

As suggested above, the tokenized asset system can provide several improvements or advantages over existing digital content systems. For example, some embodiments of the tokenized asset system introduce a digital passport not found in prior systems. Indeed, the tokenized asset system can generate and provide a digital passport that centralizes access to tokenized asset of various types and formats within a single interface location. The tokenized asset system can further utilize a digital passport to verify ownership of (or some other type of affiliation with) one or more tokenized asset that permit access to a tokenized gate access content item.

By combining features of a content management system with those of a tokenized asset management system, the tokenized asset system can improve security over prior systems. For example, whereas the fragmented nature of some prior systems risks overexposure of sensitive and/or valuable data across their many platforms and applications, the tokenized asset system reduces the exposure of such data. Specifically, the tokenized asset system consolidates tokenized assets of various types and/or stored on various blockchains to a single location or a single access point (for a given user account), reducing the number of potential data exposures comparing to existing systems that each have their own access point with a separate login.

Further relating to improved security, in some embodiments the tokenized asset system better protects sensitive of valuable digital content than prior digital content systems. In particular, the tokenized asset system provides secure gating tools for gating or protecting individual content items (or folders or collections of content items) using tokenized assets. Indeed, compared to existing systems that inadequately protect individual content items (and that, therefore, risk damage or loss of content items), the tokenized asset system prevents damage or loss of content items using tokenized gating. Specifically, the tokenized asset system provides a tokenized gating interface for fast, secure gating using a variety of gating rules not found in prior systems.

Using the digital passport, some embodiments of the tokenized asset system can more flexibly adapt to managing tokenized asset across various platforms and can adapt to facilitating access to gated content across different systems.

In contrast with prior systems that use a fragmented approach where each type of tokenized asset is managed in its own asset-specific environment and where each of those environments is further separated from content management platforms, the tokenized asset system can flexibly adapt a digital passport to (automatically identify and) provide links to various types of tokenized assets within a centralized location.

In addition, the tokenized asset system can bridge the gap between gated content and tokenized assets by intelligently (and automatically) identifying tokenized assets associated with a user account utilizing a digital passport (e.g., for gated content within a content management system associated with the tokenized asset system or within a third party content system outside of the content management system). Indeed, unlike prior systems, the tokenized asset system flexibly provides an adaptive ecosystem that accommodates management of content items and tokenized assets together within a single platform.

Due at least in part to its improved flexibility, embodiments of the tokenized asset system can provide more efficient user interfaces than those provided by existing digital content systems. For example, while some prior systems generate and provide separate user interfaces or even separate applications for managing different tokenized assets, the tokenized asset system can provide a unified passport interface that integrates tokenized assets across different platforms into a single location. Consequently, compared to some prior systems, the tokenized asset system can reduce the number of user interactions required to access and manage tokenized assets, thereby preserving computing resources that would otherwise be required to process those user interactions.

Along these lines, the tokenized asset system can also facilitate more efficient access to gated content than prior systems. For instance, while many existing systems require navigation back and forth between several interfaces and/or applications to locate gated content, identify a tokenized asset that would permit access to the gated content, locate the tokenized asset, and provide the tokenized asset to access the gated content, the tokenized asset system can circumvent much of this navigation by intelligently identifying a tokenized asset required to access gated content directly from a digital passport and automatically providing an indication of the tokenized asset to access the gated content. As a result, the tokenized asset system can reduce the number of user interactions (and the corresponding computational burden) of accessing gated content compared to prior systems.

As illustrated by the foregoing discussion, the present disclosure utilizes a variety of terms to describe features and benefits of the tokenized asset system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a digital video file, a web file, a digital document file, or some other type of file or digital object. A digital content item can have a particular file type or file format, which may differ for different types of digital content items (e.g., digital documents or digital images). In some cases, a digital content item can refer to a remotely stored (e.g., cloud-based) item or a link (e.g., a link to a cloud-based item or a web-based content item) and/or a content clip that indicates (or links) a discrete selection or segmented portion of content from a webpage or some other content item or source. A digital content item can be editable or otherwise modifiable and can also be sharable from one user account (or client device) to another. In some cases, a digital content item is modifiable by multiple user accounts (or client devices) simultaneously and/or at different times.

As mentioned, the tokenized asset system can manage tokenized assets for a user account. As used herein, the term "tokenized asset" refers to a digital asset that is tokenized by storing data on, or linking data to, a blockchain. A tokenized asset can include a unit of data that is stored on a blockchain that is tradeable, sellable, or otherwise transferable. For example, a tokenized asset can include one of various types, such as an NFT, a cryptocurrency, or a tokenized digital pass. In some cases, a tokenized asset is represented by a link to one or more smart contracts (e.g., smart contract addresses) or blocks stored on a blockchain. In certain embodiments, a tokenized asset refers to a tokenized version (or a blockchain-based version) of a content item such as a digital image or a website, or a combination of multiple content items. A tokenized asset can also include (or correspond to) "tokenized asset data" such as ownership information, creator information, a smart contract address (e.g., an address for a blockchain block explorer that locates blocks corresponding to tokenized assets) for a tokenized asset, or other information pertaining to a tokenized asset.

Relatedly, the term "blockchain" as used herein refers to a ledger of records (e.g., smart contracts) maintained across a plurality of computing devices and linked together using cryptography. In particular, a blockchain can include one or more common data structures or "blocks" that each contain a cryptographic hash of a previous block, a timestamp, and transaction data. As blocks contain information about previous blocks, the blocks form a chain of blocks (or "blockchain") with each block reinforcing those previous. In some cases, a blockchain is managed by a peer-to-peer network for use as a publicly distributed ledger, where nodes (e.g., connected computing devices) collectively adhere to a protocol to communicate and validate new blocks. A blockchain can include or store units of data such as tokenized asset in the form of smart contracts or blocks.

As used herein, the term "blockchain key" refers to a private cryptographic key for a blockchain. In particular, a blockchain key can refer to a cryptographic key associated with a user account that is maintained in secrecy. An example use of a blockchain key includes signing (e.g., encrypting) a transaction sent from a user account using a blockchain key corresponding to the user account. For instance, the tokenized asset system can use a blockchain key to sign a transaction for minting, transferring, purchasing, trading, or performing some other transaction for a tokenized asset.

As mentioned, in some embodiments the tokenized asset system can generate and manage a digital passport for a user account. As used herein, the term "digital passport" (or sometimes simply "passport") refers to a collection or grouping of tokenized assets. For example, a digital passport can include links to tokenized assets across various platforms and/or blockchains (e.g., an ETHEREUM blockchain, a BITCOIN blockchain, or another blockchain). In some cases, a digital passport refers to a particular user interface (or user interface element) such as a passport interface that includes links (e.g., to smart contract addresses) for tokenized assets. In some cases, a digital passport can include, in addition to tokenized assets, one or more untokenized assets.

As mentioned above, in certain embodiments the tokenized asset system manages, or determines access permissions for, tokenized gate access content items. As used herein, the term "tokenized gate access content item" (or simply "gated content item") refers to a content item that is gated or protected. For example, a tokenized gate access content item includes a content item with restricted access such that access is permitted only to user accounts that satisfy one or more conditions or criteria. In some cases, a tokenized gate access content item is gated by requiring a user account to own (or otherwise be associated with) a particular tokenized asset (or multiple tokenized assets). In some cases, a tokenized gate access content item includes a gated website or a protected folder or a protected content collection within a content management system.

As mentioned, in some embodiments the tokenized asset system mints (or causes to be minted) tokenized assets. As used herein the term "mint" (and its variations such as "minting" or "minted") refers to a process of generating a tokenized asset within a blockchain. For example, minting includes a process for converting a content item into tokenized content such as a blockchain-based tokenized asset. For instance, minting can include storing data for a content item in a decentralized database or a distributed ledger to transform the content item into a tokenized asset that is nonfungible or non-interchangeable and stored in, or otherwise linked to, a blockchain. In some cases, minting involves generating smart contracts to represent data from a content item, where the content item data is stored in a blockchain or in a decentralized database associated with a blockchain.

In certain embodiments, minting involves generating an "asset voucher" that refers to a cryptographic signature (e.g., signed via a blockchain key) of some data that is redeemable for a tokenized asset. In some cases, an asset voucher represents or corresponds to a content item that is flagged or indicated to include within a tokenized asset. For instance, the tokenized asset can generate an asset voucher to delay or postpone a minting cost of actually minting a tokenized asset until a later time or a later event, such as a purchase event. Indeed, the tokenized asset system can receive a request to generate a tokenized asset and can generate an asset voucher to wait until the asset voucher is purchased before minting the corresponding tokenized asset. As just suggested, minting can involve a "minting cost" that refers to a processing cost or expense required to mint a tokenized asset. For example, a minting cost can represent or reflect a computational requirement for minting a tokenized asset, or a monetary amount to purchase the energy required to perform the computations for the minting process.

Additional detail regarding the tokenized asset system will now be provided with reference to the figures. For example, FIG. 1 illustrates a schematic diagram of an example system environment for implementing a tokenized asset system 102 in accordance with one or more implementations. An overview of the tokenized asset system 102 is described in relation to FIG. 1. Thereafter, a more detailed description of the components and processes of the tokenized asset system 102 is provided in relation to the subsequent figures.

As shown, the environment includes server(s) 104, a client device 108, a third party content system 114, an asset minting system 116, blockchain nodes 118, and a network 112. Each of the components of the environment can communicate via the network 112, and the network 112 may be any suitable network over which computing devices can communicate. Example networks are discussed in more detail below in relation to FIGS. 17-18.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 17-18. The client device 108 can communicate with the server(s) 104, the third party content system 114, and/or the asset minting system 116, via the network 112. For example, the client device 108 can receive user input from respective users interacting with the client device 108 (e.g., via the client application 110) to, for example, access gated content, add tokenized asset to a collection, generate a tokenized asset from one or more content items, or perform some other action. In addition, the tokenized asset system 102 on the server(s) 104 can receive information relating to various interactions with content items, tokenized assets, and/or user interface elements based on the input received by the client device 108 (e.g., to access content items, generate tokenized assets, or perform some other action).

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface such as a content management interface that includes elements for digital content items and/or a passport interface (e.g., as an element or portion of a content management interface) for managing tokenized assets. Additionally, the client device 108, through the client application 110, can present information in the form of user interfaces (and constituent interface elements), digital content items, tokenized asset, a digital passport, and tokenized asset data.

As illustrated in FIG. 1, the example environment also includes the server(s) 104. The server(s) 104 may generate, track, store, process, receive, and transmit electronic data, such as digital content items, interactions with digital content items, interactions between user accounts or client devices, and/or tokenized assets. For example, the server(s) 104 may receive data from the client device 108 in the form of a request to generate a tokenized asset from a content item within a content management system. In addition, the server(s) 104 can transmit data to the client device 108 in the form of a tokenized asset link, corresponding tokenized asset data, and a digital passport interface. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the tokenized asset system 102 as part of a content management system 106. The content management system 106 can communicate with the client device 108 to perform various functions associated with the client application 110 such as managing user accounts, managing content items, managing tokenized assets, and facilitating user interaction with the digital content items and/or tokenized assets. In some embodiments, the tokenized asset system 102 and/or the content management system utilize a database to store and access information such as digital content items, tokenized assets, and other information.

Although FIG. 1 depicts the tokenized asset system 102 located on the server(s) 104, in some implementations, the tokenized asset system 102 may be implemented by (e.g., located entirely or in part) on one or more other components of the environment. For example, the tokenized asset system 102 may be implemented by the client device 108, and/or a third-party device. For example, the client device 108 can download all or part of the tokenized asset system 102 for implementation independent of, or together with, the server(s) 104.

As further illustrated in FIG. 1, the environment includes a third party content system 114. In particular, the third party content system 114 is in communication with the server(s) 104 and/or the client device 108 via the network 112. In some cases, the third party content system 114 manages content items such as tokenized gate access content items outside of the content management system 106. For example, the third party content system 114 manages content items such as websites, digital images, digital audio, digital video, or some other digital content. The third party content system 114 can provide access to, or consumption of, content items by the client device 108 based on, for example, an indication that a user account of the client device 108 is associated with (e.g., owns) a certain tokenized asset (or certain tokenized assets).

Additionally, the environment of FIG. 1 includes an asset minting system 116. In some embodiments, the asset minting system 116 generates or mints tokenized assets based on indications from the tokenized asset system 102 (e.g., on the server(s) 104 or the client device 108). For instance, the asset minting system 116 mints a tokenized asset by generating tokenized asset data from digital content data. In some cases, the asset minting system 116 mints or generates a tokenized asset by converting a content item (or a combination of content items) into a tokenized asset on a blockchain and associated with a blockchain key. For example, in certain embodiments, the asset minting system 116 stores a tokenized asset in a decentralized database and associates the stored data with smart contracts within a distributed ledger or a blockchain and further associates the tokenized asset with a user account (e.g., utilizing a blockchain key of a user account within the content management system 106).

As further illustrated in FIG. 1, the environment includes blockchain nodes 118. In particular, the blockchain nodes 118 can generate, store, receive, and/or transmit data, including data corresponding to a digital ledger of transactions or smart contracts (e.g., including data corresponding to tokenized asset generated from content items). For example, the blockchain nodes 118 can receive transaction requests and can transmit transaction execution results (e.g., to obtain consensus among the blockchain nodes 118). In one or more embodiments, at least one of the blockchain nodes 118 comprises a data server. In some embodiments, at least one of the blockchain nodes 118 comprises a communication server or a web-hosting server. In further embodiments, one or more of the blockchain nodes 118 include personal computing devices operated by a user. In one or more embodiments, as shown in FIG. 1, the blockchain nodes 118 can transmit data to one another. For example, a given blockchain node can transmit data to a particular blockchain node using point-to-point communication or some other type of peer-to-peer (or other) communication protocol. A given blockchain node can also transmit data to multiple other blockchain nodes.

In some implementations, though not illustrated in FIG. 1, the environment may have a different arrangement of components and/or may have a different number or set of components altogether. For example, the client device 108 may communicate directly with the tokenized asset system 102, bypassing the network 112. As another example, the environment may include multiple client devices, each associated with a different user for managing digital content items and/or tokenized assets. In addition, the environment can include the database located external to the server(s) 104 (e.g., in communication via the network 112) or located on the server(s) 104 and/or on the client device 108.

Generating Tokenized Assets

Figure 2:
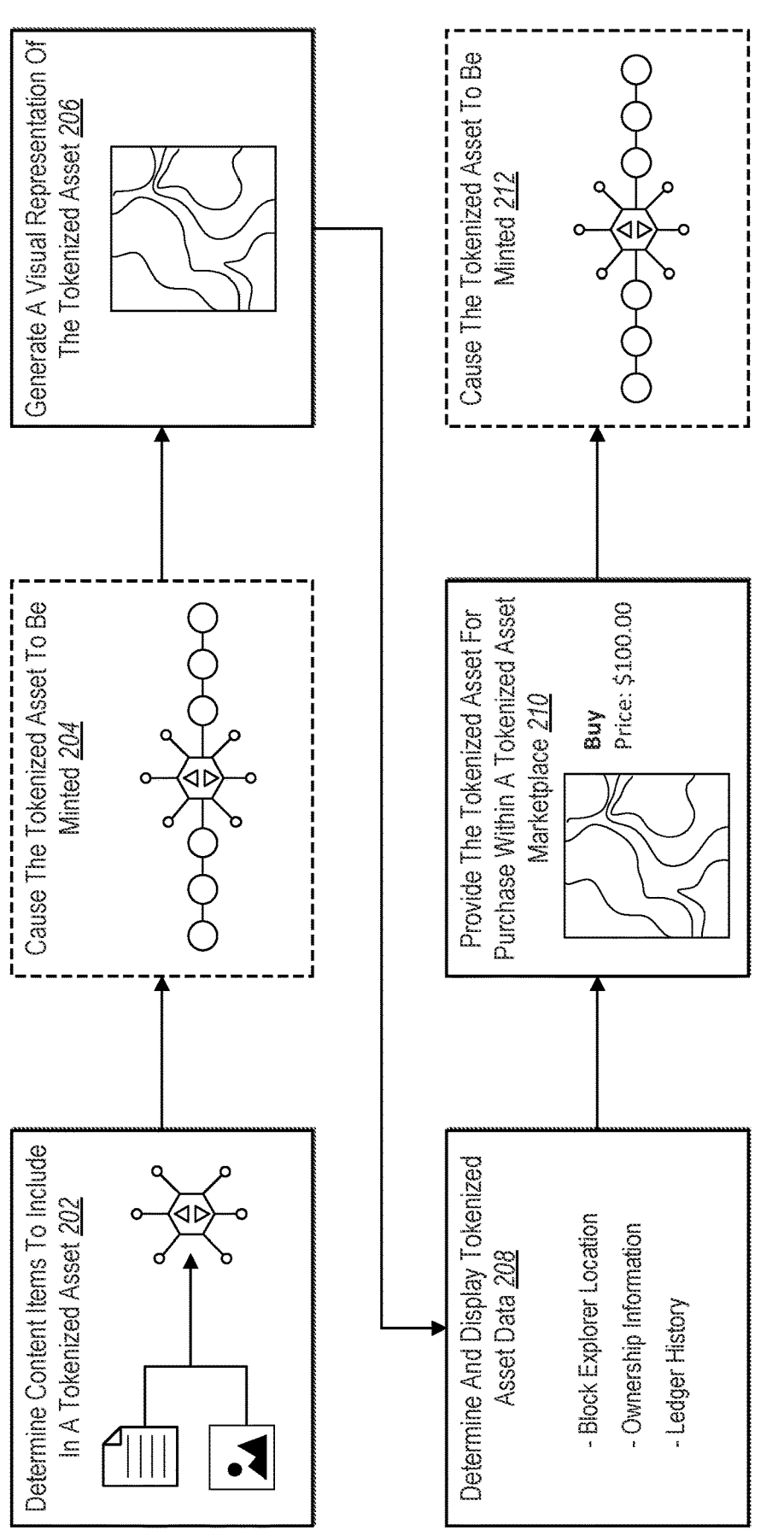
FIG. 2 illustrates an overview of generating and managing a tokenized asset in accordance with one or more embodiments.

As mentioned above, the tokenized asset system 102 can generate or mint tokenized assets. In particular, the tokenized asset system 102 can mint a tokenized asset by generating tokenized data on a blockchain to represent, or refer to a decentralized storage location of, data for one or more content items included as part of the tokenized asset. FIG. 2 illustrates an example overview of generating or minting a tokenized asset in accordance with one or more embodiments. Additional detail regarding the various acts illustrated in FIG. 2 is provided thereafter with reference to subsequent figures.

As illustrated in FIG. 2, the tokenized asset system 102 performs an act 202 to determine content items to include in a tokenized asset. In particular, the tokenized asset system 102 identifies or selects one or more content items from the content management system 106 to include within a tokenized asset. For example, the tokenized asset system 102 receives an indication from the client device 108 of a user selection of one or more content items associated with, or belonging to, a user account with the content management system 106. In certain cases, the tokenized asset system 102 identifies a single content item to include within, or convert into, a tokenized asset. In other cases, the tokenized asset system 102 identifies multiple content items to include within, or combine into, a tokenized asset. As shown, the tokenized asset system 102 identifies two content items, a document and a digital image, to combine into a tokenized asset.

As further illustrated in FIG. 2, the tokenized asset system 102 performs an act 204 to cause the tokenized asset to be minted. To elaborate, in some cases, the tokenized asset system 102 generates tokenized data such as one or more smart contracts to include within or store on a blockchain and that represent or reference the one or more content items selected to include within the tokenized asset. In certain cases, the tokenized asset system 102 mints to a particular blockchain such as the ETHEREUM blockchain by creating one or more smart contracts to include within the distributed ledger of the blockchain in accordance with a particular token standard for the blockchain (e.g., ERC-20, ERC-1155, or some other standard). In some implementations, the tokenized asset system 102 further stores tokenized asset data reflecting the digital content items within a decentralized storage location such that smart contracts within the blockchain can reference the data to display (or otherwise provide) corresponding content (e.g., upon some transaction such a transfer of the tokenized asset or smart contract(s)).

In some embodiments, the tokenized asset system 102 does not directly mint a tokenized asset. Instead, the tokenized asset system 102 utilizes an asset minting system (e.g., the asset minting system 116) to mint a tokenized asset. For example, the tokenized asset system 102 communicates with the asset minting system 116 to provide content data associated with one or more content items selected to include within a tokenized asset. In some cases, the tokenized asset system 102 provides content item(s) for minting, whereupon the asset minting system 116 mints a tokenized asset from the content item(s) and provides information back to the tokenized asset system 102, such as tokenized asset data including an address (e.g., a blockchain block explorer address) associated with the tokenized asset within a blockchain (e.g., a blockchain used to mint the tokenized asset).

As further illustrated in FIG. 2, the tokenized asset system 102 performs an act 206 to generate a visual representation of the tokenized asset. More particularly, the tokenized asset system 102 generates a visual representation of the tokenized asset by generating a digital image, a series of digital images, a digital video, or some other visual representation that is observable by a viewer. In some cases, the tokenized asset system 102 generates a visual representation that mimics or resembles the content item(s) from which the tokenized asset was minted. For example, if the tokenized asset is minted from a single content item, the tokenized asset system 102 generates a visual representation to resemble (e.g., match) the single content item. If, on the other hand, the tokenized asset is minted from multiple content items, the tokenized asset system 102 generates a visual representation reflecting a combination of the multiple content items (e.g., according to user input defining the combination or the visual representation).

As shown in FIG. 2, the tokenized asset system 102 also performs an act 208 to determine and display tokenized asset data. To elaborate, the tokenized asset system 102 determines tokenized asset data including a tokenized asset name or title, ownership information (e.g., indicating a user account of a current owner of the tokenized asset), creator information (e.g., indicating a user account of a creator of the tokenized asset), a location indicator (e.g., specifying a storage location or a contract address of the tokenized asset within a blockchain block explorer such as ETHERSCAN), and/or a ledger history (e.g., indicating historical transfers of the tokenized asset between various owner accounts). In some embodiments, the tokenized asset system 102 further provides the tokenized asset data for display on the client device 108. For instance, the tokenized asset system 102 provides the tokenized asset data for display within a particular user interface such as a content management interface, a tokenized asset collection interface, a passport interface, or some other user interface for displaying tokenized assets and corresponding tokenized asset data.

Additionally, the tokenized asset system 102 performs an act 210 to provide the tokenized asset for purchase within a tokenized asset marketplace. More specifically, the tokenized asset system 102 generates and provides an asset purchase interface whereby user accounts within the content management system 106 can view and purchase the tokenized asset. In some cases, the tokenized asset system 102 provides the tokenized asset to a third party asset marketplace (e.g., by providing the name of the tokenized asset along with its contract address) to make the tokenized asset available for purchase.

In some embodiments, the tokenized asset system 102 further performs an act 212 to cause the tokenized asset to be minted after receiving an indication of a purchase. To elaborate, the tokenized asset system 102 can perform a process called lazy minting to generate or mint a tokenized asset only after it is purchase. For example, the tokenized asset system 102 generates a visual representation of a tokenized asset without actually generating or minting the tokenized asset itself (until after a purchase). In some cases, the tokenized asset system 102 further generates all or some of the tokenized asset data to accompany the tokenized asset upon minting. In addition, the tokenized asset system 102 receives a purchase request from a client device or from a third party marketplace. In response to the purchase request, the tokenized asset system 102 mints (or provides to the asset minting system 116 for minting) the tokenized asset, as described above in relation to the act 204. In some cases, the process of lazy minting (or minting only upon purchase or transfer of a tokenized asset) postpones or delays the minting cost associated with minting the tokenized asset until after a transfer occurs.

Figure 3:
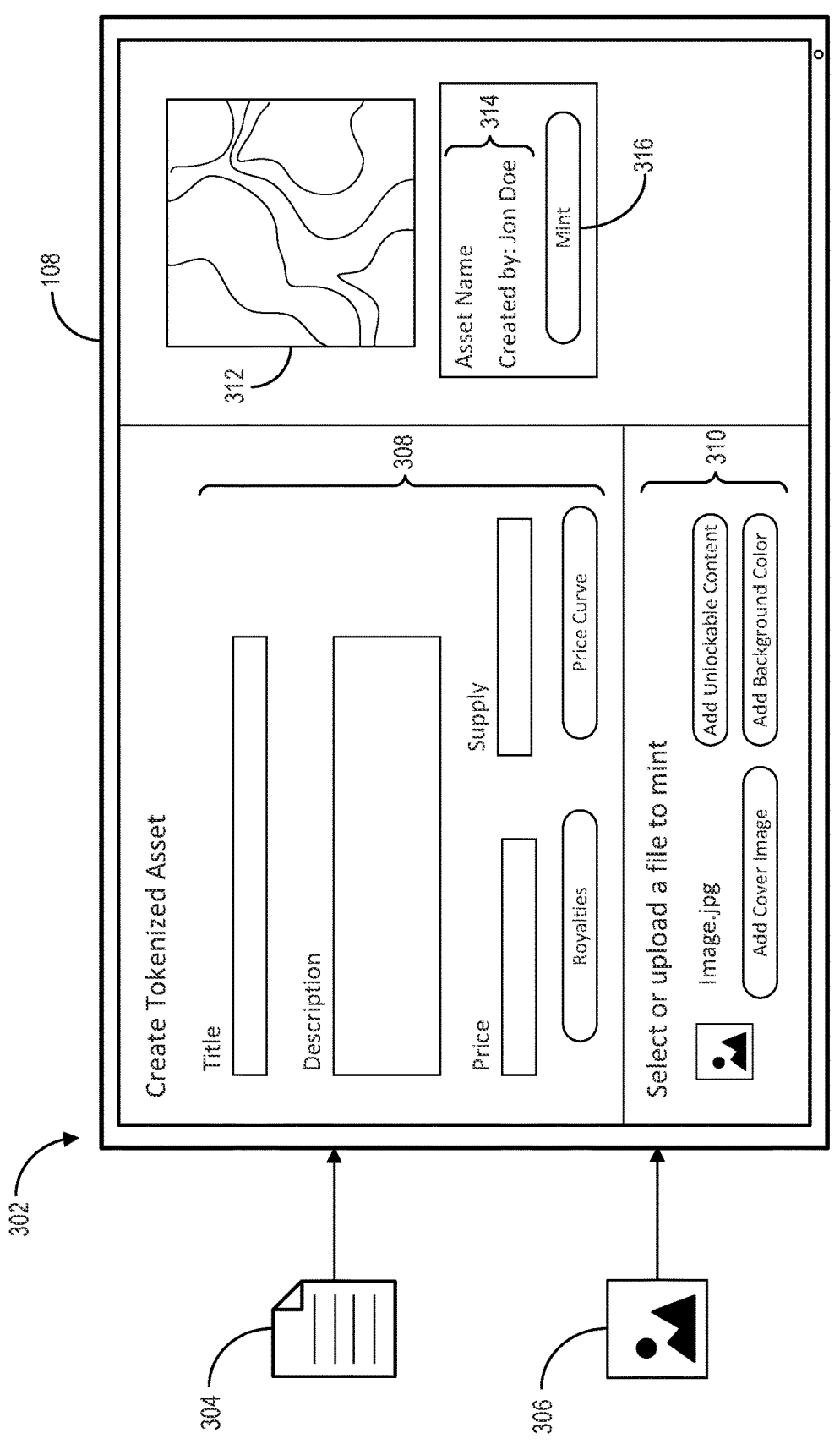
FIG. 3 illustrates an example asset creation interface for generating a tokenized asset in accordance with one or more embodiments.

As mentioned, in certain described embodiments, the tokenized asset system 102 generates a tokenized asset from one or more content items. In particular, the tokenized asset system 102 generates or mints a tokenized asset from content items associated with a user account and stored within the content management system 106. FIG. 3 illustrates as asset creation interface for generating tokenized assets in accordance with one or more embodiments.

As illustrated in FIG. 3, the client device 108 displays an asset creation interface 302 that includes different portions or sections for generating a tokenized asset from content items. For example, the tokenized asset system 102 receives a selection from the client device 108 of the content item 304 and the content item 306 from within the content management system 106 (and stored in a particular storage location associated with the user account corresponding to the client device 108). Indeed, the tokenized asset system 102 receives a request to generate a tokenized asset that reflects a combination of the content item 304 and the content item 306. In some cases, the tokenized asset system 102 generates or mints the tokenized asset or provides the content items 304 and 306, along with the information entered in the asset creation interface 302, to the asset minting system 116 for minting.

As shown, the asset creation interface 302 includes a tokenized asset data entry portion 308. In particular, the tokenized asset data entry portion 308 includes data entry fields for entering tokenized asset data (e.g., various metadata) associated with a tokenized asset. For example, the tokenized asset system 102 receives an indication of a title for a tokenized asset. In addition, the tokenized asset system 102 receives an indication for a description, a price (e.g., in standard currency and/or cryptocurrency), a supply (e.g., a number of tokenized assets to mint from the content items 304 and 306), royalties (e.g., an indication of payment to a tokenized asset creator for subsequent transfers or uses of the tokenized asset), and/or a price curve (e.g., changes to pricing over time or based on factors such as purchases or transfers). Upon minting, the tokenized asset system 102 includes (or causes the asset minting system 116 to include) the entered tokenized asset data as part of the tokenized asset minted to a blockchain (or linked to the tokenized asset minted on the blockchain).

As further illustrated in FIG. 3, the asset creation interface 302 includes a content item selection portion 310. More specifically, the content item selection portion 310 includes selectable options or elements for a user account to indicate one or more content items (e.g., the content items 304 and 306) to include with a tokenized asset. As shown, the tokenized asset system 102 receives an indication to upload the content item 304 ("Image.jpg") to include within a tokenized asset. In some cases, the tokenized asset system 102 receives an indication to upload a different content item such as a document (e.g., a pdf or some other document type), an audio clip, or a digital video. For instance, the tokenized asset system 102 can receive an indication to upload the content item 306.

In some cases, the content item selection portion 310 further includes an option to add a cover image (e.g., the "Add Cover Image" button) that masks or hides the actual visual content of the tokenized asset to instead depict a cover image for public viewing (e.g., where the actual tokenized asset is viewable only upon transfer or purchase). In one or more embodiments, the tokenized asset system 102 analyzes digital content items stored via a content management system to recommend digital content items to utilize as tokenized assets. For example, the tokenized asset system 102 can analyze usage (by a user or multiple users) with a digital content item, creation of a digital content item, and/or interactions with a digital content item, and surface a recommendation (e.g., via the asset creation interface 302) to mint the digital content item as a tokenized asset.

Indeed, if the tokenized asset system 102 receives an indication of a cover image (or a cover animation), the tokenized asset system 102 can replace the visual representation 312 with the cover image in a preview pane (e.g., the portion of the asset creation interface 302 to the right of the vertical dividing line). In some embodiments, the tokenized asset system 102 utilizes the cover image (or the cover animation) to depict one or more tokenized assets coming soon (e.g., to be available at a certain date). In these or other embodiments, the tokenized asset system 102 utilizes the cover image for a certain duration and automatically reveals the actual tokenized asset at a certain date (or based on a purchase of the tokenized asset). For instance, the tokenized asset system 102 can utilize a batch reveal scheme, where multiple tokenized assets within a given collection are revealed at particular dates and where the collection includes multiple batches (each with their own reveal date), such that the cover images are removed to reveal the actual tokenized assets and/or the tokenized asset system 102 makes the tokenized assets available for purchase at the reveal dates.

Further, the content item selection portion 310 includes an option to add a background color (e.g., the "Add Background Color" button). For example, the tokenized asset system 102 receives an indication from the client device 108 to add or modify a background color associated with a tokenized asset. In some cases, the tokenized asset system 102 generates or modifies the preview pane to depict the indicated background color (e.g., by applying the background color to pixels of the preview pane other than those of the visual representation 312 and the box for the tokenized asset data 314).

In some embodiments, the content item selection portion 310 further includes an option to add unlockable content. For instance, the tokenized asset system 102 receives an indication to add or associated unlockable content such as an exclusive content item or an unpublished link to a content item that is made available to a user account upon transfer or purchase of a tokenized asset. More specifically, the tokenized asset system 102 can receive an indication of a content item (or a link) to include with the tokenized asset upon minting and that is unlocked (or made accessible or provided to) a purchasing user account or a recipient user account upon obtaining the tokenized asset.

Based on receiving an indication of the content item 304 and the content item 306 to combine into a tokenized asset (and/or indications of a cover image, unlockable content, and a background color), the tokenized asset system 102 generates a visual representation 312 to visually portray or reflect what the tokenized asset will look like upon minting. In some cases, the visual representation 312 is a preview and is accompanied by a corresponding preview of tokenized asset data 314, such as an asset name (or title) and creator information. Indeed, the tokenized asset system 102 determines and provides the tokenized asset data 314 for display to accompany the visual representation 312 (and the corresponding tokenized asset) for quick, easy access.

In addition, the tokenized asset system 102 provides a minting option 316. In particular, the tokenized asset system 102 provides the minting option 316 as a selectable interface element for minting a tokenized asset corresponding to the visual representation 312 (and from the content items 304 and 306). In some implementations, the tokenized asset system 102 mints the tokenized asset in response to user interaction selecting the minting option 316. In other implementations, the tokenized asset system 102 provides the tokenized asset to the asset minting system 116 for minting in response to user interaction selecting the minting option 316. In certain embodiments, the tokenized asset system 12 designates or flags the tokenized asset for minting (at a later time or based on a later purchase event or transfer event) based on user interaction selecting the minting option 316.

Figure 4:
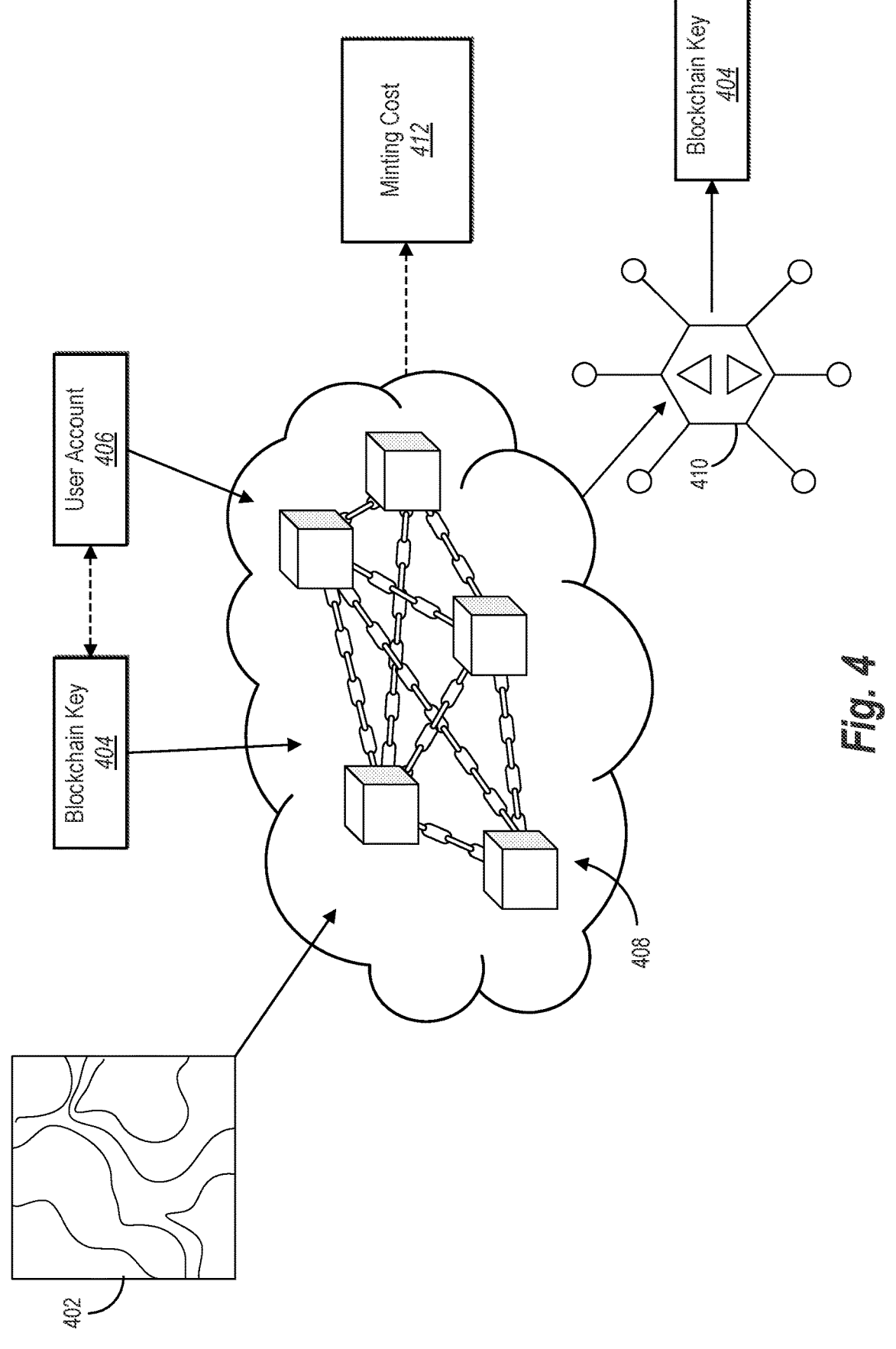
FIG. 4 illustrates an example diagram for minting a tokenized asset in accordance with one or more embodiments.

As mentioned above, in certain described embodiments, the tokenized asset system 102 mints (or causes to be minted) a tokenized asset from one or more content items. In particular, the tokenized asset system 102 mints a tokenized asset by generating (or causing to be generated) transactions (or smart contracts) to include or store as blocks within a blockchain. FIG. 4 illustrates an example representation of minting a tokenized asset in accordance with one or more embodiments. While the description of FIG. 4 includes actions or processes primarily performed by the tokenized asset system 102, in some embodiments, the tokenized asset system 102 provides information or instructions to the asset minting system 116 for performing the described actions or processes.

As illustrated in FIG. 4, the tokenized asset system 102 mints a tokenized asset 410. In particular, the tokenized asset system 102 mints the tokenized asset 410 from one or more content items represented by the visual representation 402. For example, the tokenized asset system 102 utilizes the blockchain 408 to mint the tokenized asset 410 from the visual representation 402 (or from the content items represented by the visual representation 402). In some cases, the tokenized asset system 102 utilizes the blockchain 408 together with the blockchain key 404 to mint the tokenized asset 410.

To elaborate on minting the tokenized asset 410, in some embodiments, the tokenized asset system 102 generates one or more transactions or smart contracts to include as blocks within the blockchain 408 and which represent, reflect, and/or refer to the tokenized asset 410 (and which correspond to the content items reflected by the visual representation 402). For example, the tokenized asset system 102 generates or writes transactions to the blockchain 408 using a blockchain key 404 (associated with the user account 406 within the content management system 106) as a private, secure way to validate the transactions. In some cases, the tokenized asset system 102 validates the transactions by utilizing multiple blockchain nodes within the blockchain 408 to generate or replicate the transactions (e.g., to generate the same result from the blockchain key 404) for redundancy. In doing so, the tokenized asset system 102 ties or associates the transactions (and ultimately the tokenized asset 410) to the blockchain key 404. In certain cases, the blockchain key 404 indicates ownership of the tokenized asset 410 (and/or creatorship of the tokenized asset 410). In some implementations, tokenized asset system 102 mints to a particular blockchain such as the ETHEREUM blockchain using a particular token standard such as ERC-20, ERC-1155, ERC-721, ERC-777, or some other token standard (or on some other blockchain).

In one or more embodiments, the tokenized asset system 102 also associates or ties a user account 406 (e.g., a user account associated with the client device 108) to the tokenized asset 410. For example, the tokenized asset system 102 identifies the user account 406 within the content management system 106 as corresponding to the blockchain key 404. Based on associating the user account 406 with the blockchain key 404, the tokenized asset system 102 determines that the user account 406 is the actor within the content management system 106 requesting the tokenized asset 410 to be minted (and that the user account 406 is the owner and/or creator of the tokenized as set 410).

In some embodiments, as part of minting the tokenized asset 410, the tokenized asset system 102 identifies or determines a minting cost 412 associated with generating or minting the tokenized asset 410. For example, the tokenized asset system 102 determines a financial cost (e.g., in standard currency or in cryptocurrency) associated with the computational requirements of minting the tokenized asset 410 through writing the transactions to the blockchain 408 (e.g., across its many nodes). In certain cases, the tokenized asset system 102 applies the minting cost 412 to the blockchain key 404 to charge a user for minting the tokenized asset 410 upon receiving a minting request. In other cases, the tokenized asset system 102 applies the minting cost 412 to the blockchain key 404 to charge the user after minting takes place (or even after a purchase or a transfer of the tokenized asset 410). As mentioned, in some embodiments the tokenized asset system 102 ties the tokenized asset 410 to the user account 406 (e.g., by tying the blockchain key 404 to the user account 406), and the tokenized asset system 102 can therefore charge the user account 406 for the minting cost 412.

Figure 5:
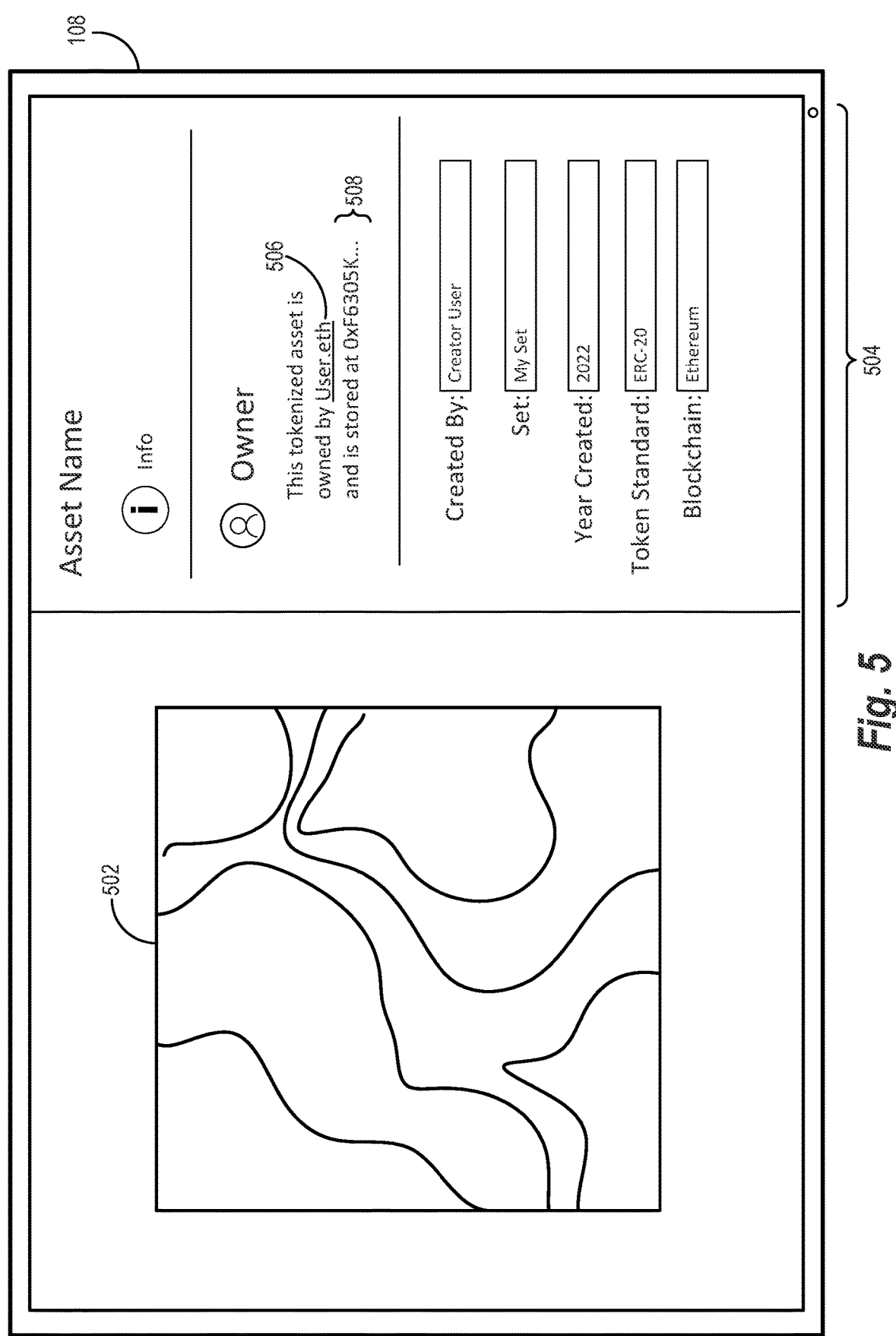
FIG. 5 illustrates an example user interface for displaying a visual representation of a tokenized asset together with tokenized asset data in accordance with one or more embodiments.

As mentioned above, in certain embodiments, the tokenized asset system 102 determines and provides tokenized asset data to accompany a tokenized asset. In particular, the tokenized asset system 102 determines tokenized asset data associated with a tokenized asset and provides the tokenized asset data for display in a centralized, easy to locate location. FIG. 5 illustrates an example user interface displaying a tokenized asset together with tokenized asset data in accordance with one or more embodiments.

As illustrated in FIG. 5, the client device 108 displays a tokenized asset 502 together with a tokenized asset data pane 504. Unlike prior systems, where locating and presenting tokenized asset data is painstaking and difficult (often requiring significant effort and several user interactions), the tokenized asset system 102 automatically (e.g., without user interaction or direction) determines tokenized asset data to display within the tokenized asset data pane 504 to accompany the tokenized asset 502. As shown, the tokenized asset data includes an asset name (or title), ownership information indicating an owner account 506 and a storage location 508 (e.g., an address of a smart contract or a transaction as indicated by a blockchain block explorer such as ETHER-SCAN).

As further shown, the tokenized asset system 102 determines and provides additional tokenized asset data for display within the tokenized asset data pane 504. For example, the tokenized asset system 102 determines a creator (e.g., a creator account associated with a particular blockchain key or a particular user account within the content management system 106) of the tokenized asset 502. In addition, the tokenized asset system 102 determines a collection or a set associated with the tokenized asset 502. For instance, if the tokenized asset 502 was created as part of a group or a set (e.g., a set of tokenized assets meant to go together as defined by a tokenized asset creator), the tokenized asset system 102 identifies the set and provides the set name for display. The tokenized asset system 102 further determines additional tokenized asset data, such as a creation time, a token standard, and a blockchain associated with the tokenized asset 502.

Figure 6:
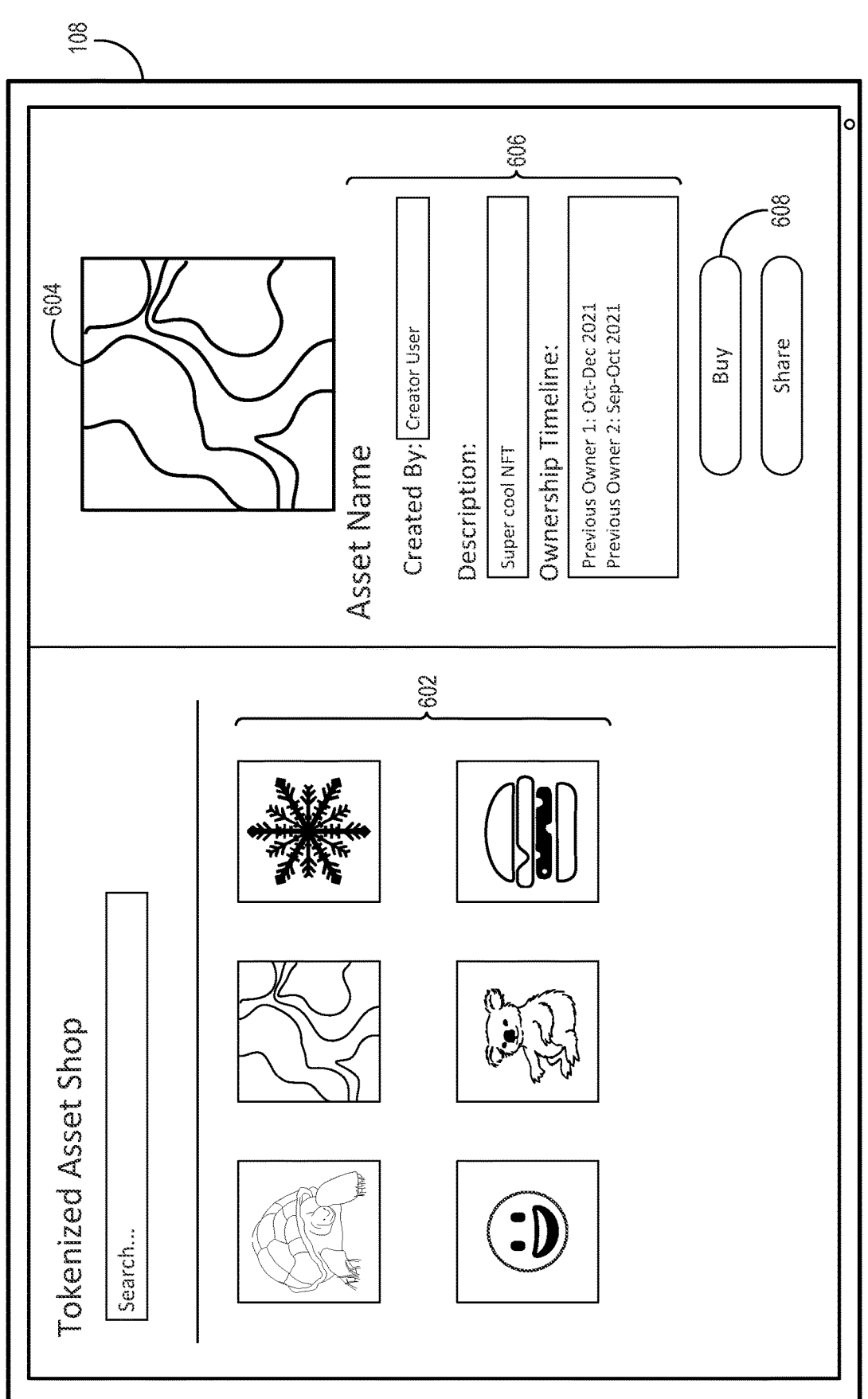
FIG. 6 illustrates an example user interface for a tokenized asset marketplace in accordance with one or more embodiments.

As mentioned above, in certain described embodiments, the tokenized asset system 102 provides a tokenized asset to a tokenized asset marketplace for purchase. In particular, the tokenized asset system 102 generates and provides a tokenized asset marketplace (e.g., within the content management system 106) to make a tokenized asset available for purchase by user accounts (e.g., user accounts within the content management system 106). In some cases, the tokenized asset system 102 provides a tokenized asset to a third party asset marketplace to make the tokenized asset available for purchase. FIG. 6 illustrates an example interface for a tokenized asset marketplace in accordance with one or more embodiments.

As illustrated in FIG. 6, the client device 108 displays an example interface for a tokenized asset marketplace, such as a tokenized asset marketplace within the content management system 106 or a third party tokenized asset marketplace outside of the content management system 106. As shown, the tokenized asset system 102 provides a set of tokenized assets 602 or purchase within the tokenized asset marketplace. Based on receiving a user interaction selecting a tokenized asset 604 from the set of tokenized assets 602, the tokenized asset system 102 provides a purchase pane that includes tokenized asset data 606, such as creator information indicating a creator user (e.g., a user account within the content management system 106 that created the tokenized asset 604) and a description of the tokenized asset 604 ("Super rad NFT").

In some implementations, the tokenized asset system 102 can determine and provide tokenized asset data 606 that indicates an ownership timeline for a tokenized asset available for purchase. For example, the tokenized asset system 102 indicates one or more previous owners (by their user accounts within the content management system 106 and/or by blockchain accounts) of the tokenized asset 604. In addition, the ownership timeline can indicate ownership timeframes associated with each of the previous owners. As shown, the tokenized asset system 102 indicates that the tokenized asset 604 was owned by Previous Owner 1 from October to December of 2021 and that the tokenized asset 604 was owned by Previous Owner 2 from September to October of 2021.

As further illustrated in FIG. 6, the tokenized asset system 102 provides a purchase option 608 selectable to purchase the tokenized asset 604. In some cases, based on receiving a selection of the purchase option 608, the tokenized asset system 102 transfers ownership of the tokenized asset 604 from the creator user account to the purchasing user account (or from a previous owner account to the purchasing user account). In certain embodiments, the tokenized asset system 102 charges a minting cost to the creator user account based on receiving a selection of the purchase option 608. Indeed, as mentioned above, the tokenized asset system 102 can utilize a lazy minting process to delay the minting cost until a purchase takes place, whereupon the tokenized asset system 102 charges the minting cost to the creator user account.

As further illustrated in FIG. 6, the tokenized asset system 102 provides a selectable option to share a tokenized asset. For example, the tokenized asset system 102 reduces the effort and number of user interactions require in prior systems to post a tokenized asset to a social media feed. Indeed, the tokenized asset system 102 provides a share option for a more seamless way to share minting or purchasing of a tokenized asset on a social media feed associated with a user account.

Figure 7:
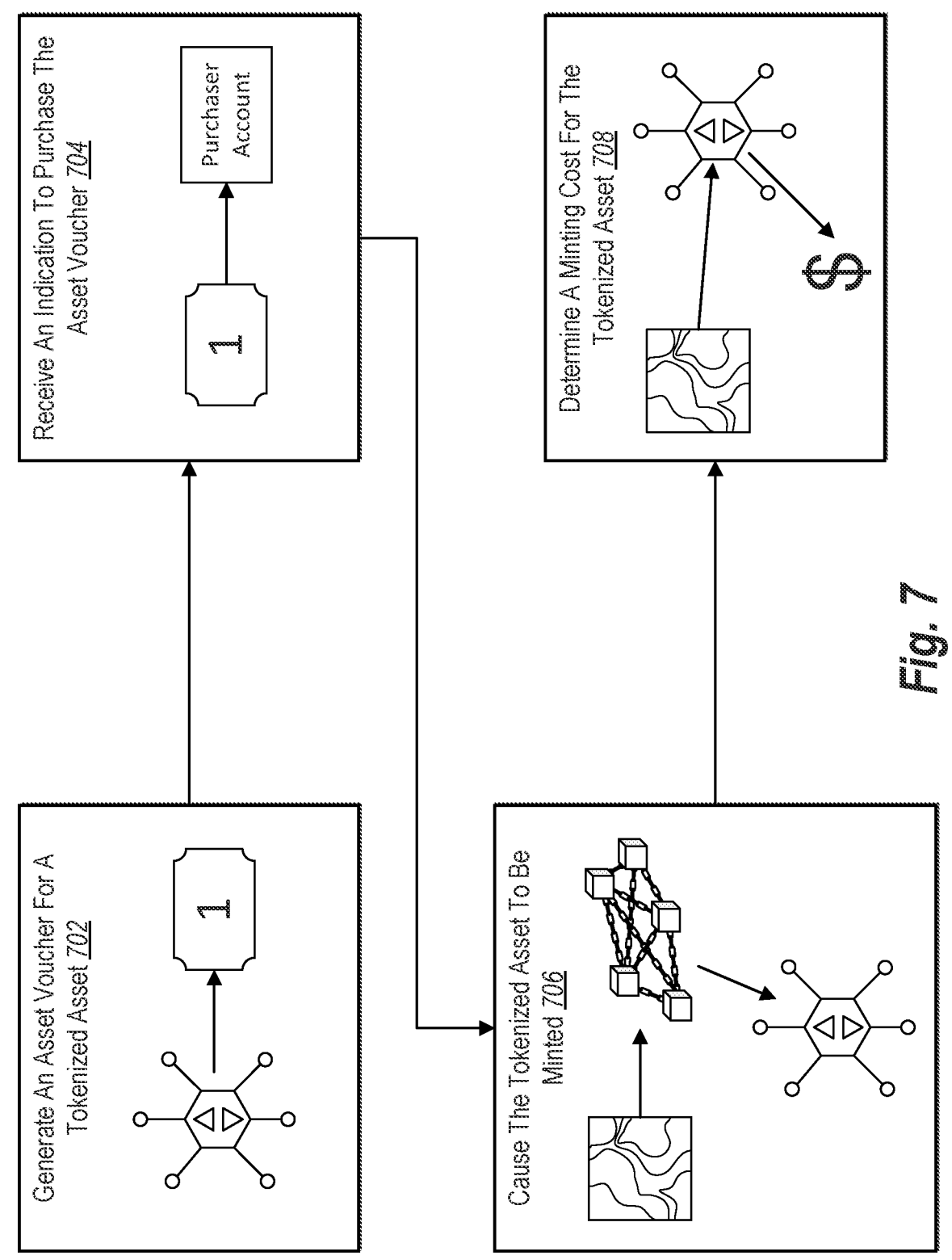
FIG. 7 illustrates an example diagram for lazy minting a tokenized asset in accordance with one or more embodiments.

As just mentioned, the tokenized asset system 102 can utilize a lazy minting process to delay a minting cost. In particular, the tokenized asset system 102 can generate a visual representation of a tokenized asset to act a preview of what the tokenized asset will look like upon minting, and the tokenized asset system 102 can provide preliminary tokenized asset data along with the preview to indicate to a purchasing user account information necessary to purchase the tokenized asset. Upon purchase, the tokenized asset system 102 can mint (or cause to be minted) the tokenized asset and can transfer the tokenized asset to the purchasing user account. FIG. 7 illustrates an example process for lazy minting a tokenized asset in accordance with one or more embodiments.

As illustrated in FIG. 7, the tokenized asset system 102 performs an act 702 to generate an asset voucher for a tokenized asset. To elaborate, upon receiving an indication or a request to delay or postpone a minting cost from a creator user account (e.g., an indication to lazy mint rather than to immediately mint or standard mint), the tokenized asset system 102 can generate an asset voucher (e.g., a set of data representing a tokenized asset) in lieu of generating the actual tokenized asset itself. The asset voucher can represent a tokenized asset, and the tokenized asset system 102 ties the asset voucher to the tokenized asset to be minted by utilizing a blockchain key associated with a creator user account to cryptographically sign some data (e.g., data associated with the to-be-minted tokenized asset, such as tokenized asset data). The tokenized asset system 102 can then utilize the asset voucher as redeemable for a tokenized asset.

As further illustrated in FIG. 7, the tokenized asset system 102 performs an act 704 to receive an indication to purchase the asset voucher. More specifically, the tokenized asset system 102 receives an indication of a user interaction selecting a purchase option from a tokenized asset marketplace. Indeed, in some cases, a selection of a purchase option indicates a request to purchase an asset voucher corresponding to a tokenized asset. Based on receiving the indication to purchase the asset voucher, the tokenized asset system 102 identifies a user account requesting the purchase. In some embodiments, the tokenized asset system 102 further determines a blockchain key associated with the user account requesting the purchase and utilizes the blockchain key to validate the purchase transaction within the blockchain.

Additionally, the tokenized asset system 102 performs an act 706 to cause the tokenized asset to be minted. Indeed, based on receiving the indication to purchase the asset voucher, the tokenized asset system 102 mints (or causes to be minted) the tokenized asset corresponding to the asset voucher. For example, as described above, the tokenized asset system 102 utilizes the blockchain key associated with the creator user account to write transactions or smart contracts utilizing nodes of a blockchain. The tokenized asset system 102 thus converts the tokenized asset corresponding to the asset voucher into tokenized data stored within the blockchain (or stored within a decentralized storage location linked to transactions written to the blockchain). The tokenized asset system 102 can further assign or transfer the newly minted tokenized asset to the purchaser account utilizing the blockchain key associated with the user account that requested purchase of the asset voucher.

As further shown in FIG. 7, the tokenized asset system 102 performs an act 708 to determine a minting cost for the tokenized asset. To elaborate, the tokenized asset system 102 determines a financial requirement for minting the tokenized asset. In some cases, minting a tokenized asset requires a significant amount of computing resources to validate transactions across the many nodes of a blockchain, and the energy required to facilitate the expenditure of such computing resources has a certain financial cost. Thus, the tokenized asset system 102 can determine the minting cost and can charge the minting cost to the creator user after minting the tokenized asset (which occurs after purchase of the tokenized asset).

Figure 8:
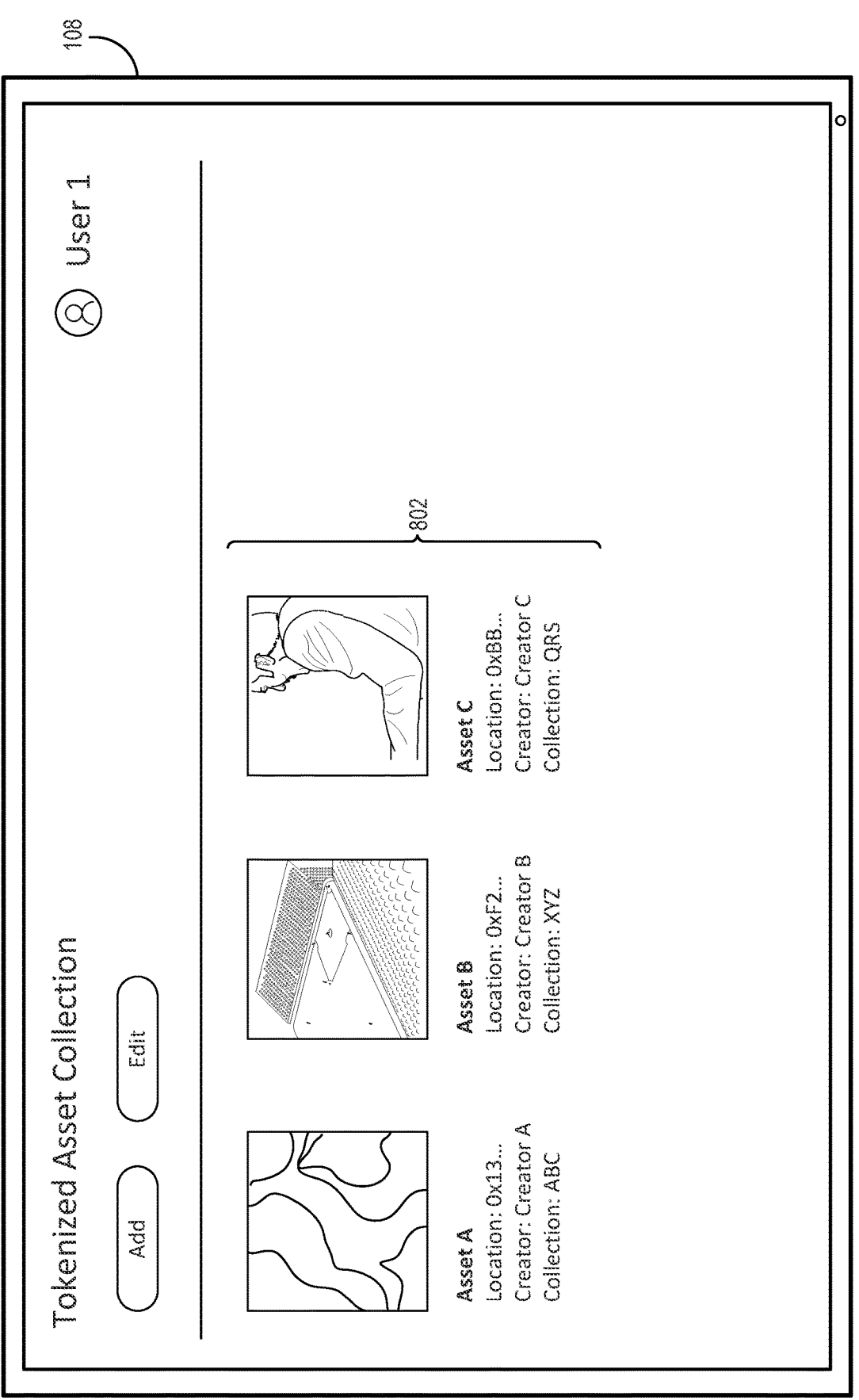
FIG. 8 illustrates an example interface for a tokenized asset collection in accordance with one or more embodiments.

As mentioned above, in certain embodiments the tokenized asset system 102 generates and provides a tokenized asset collection for display. In particular, the tokenized asset system 102 can identify tokenized assets associated with a user account within the content management system 106, where the tokenized assets (or contract addresses to the tokenized assets) are stored within the content management system 106 or in third party tokenized asset systems (using various platforms and blockchains) outside of the content management system 106. The tokenized asset system 102 can further generate a tokenized asset collection to group or consolidate the tokenized assets associated with the user account (and spread across various platforms) into a single, centralized location. FIG. 8 illustrates an example tokenized asset collection in accordance with one or more embodiments.

As illustrated in FIG. 8, the client device 108 displays a tokenized asset collection 802. In particular, the tokenized asset collection 802 includes three tokenized assets: Asset A, Asset B, and Asset C. To generate the tokenized asset collection 802, the tokenized asset system 102 can automatically (e.g., without requiring user interaction to select or locate) locate and add tokenized assets to the tokenized asset collection 802. For instance, the tokenized asset system 102 identifies Asset A from within the content management system 106 as associated with the user account of User 1, and the tokenized asset system 102 further identifies Asset B and Asset C from separate tokenized asset systems or platforms linked to the user account of User 1. In some cases, the tokenized asset system 102 receives user interactions indicating tokenized assets to add to the tokenized asset collection 802. For instance, the tokenized asset system 102 receives an address, a link, or a selection of one or more tokenized assets to import or include as part of the tokenized asset collection 802. Indeed, as shown, the asset collection interface in FIG. 8 further includes selectable options to add and edit tokenized assets within the tokenized asset collection 802.

As further illustrated in FIG. 8, the tokenized asset system 102 gathers tokenized asset data to display in relation to the tokenized assets within the tokenized asset collection 802. For example, the tokenized asset system 102 determines tokenized asset data for Asset A from within the content management system 106, and the tokenized asset system 102 determines tokenized asset data for Asset B and Asset C from their respective systems or platforms. In certain cases, the tokenized asset system 102 also determines tokenized asset data from blockchain block explorers, blockchains, or other sources corresponding to the tokenized assets. As shown, the tokenized asset system 102 further provides the tokenized asset data for display, including a location (e.g., a smart contract address of a tokenized asset within a blockchain block explorer), a creator account, a collection, and/or other tokenized asset described herein.

Figure 9:
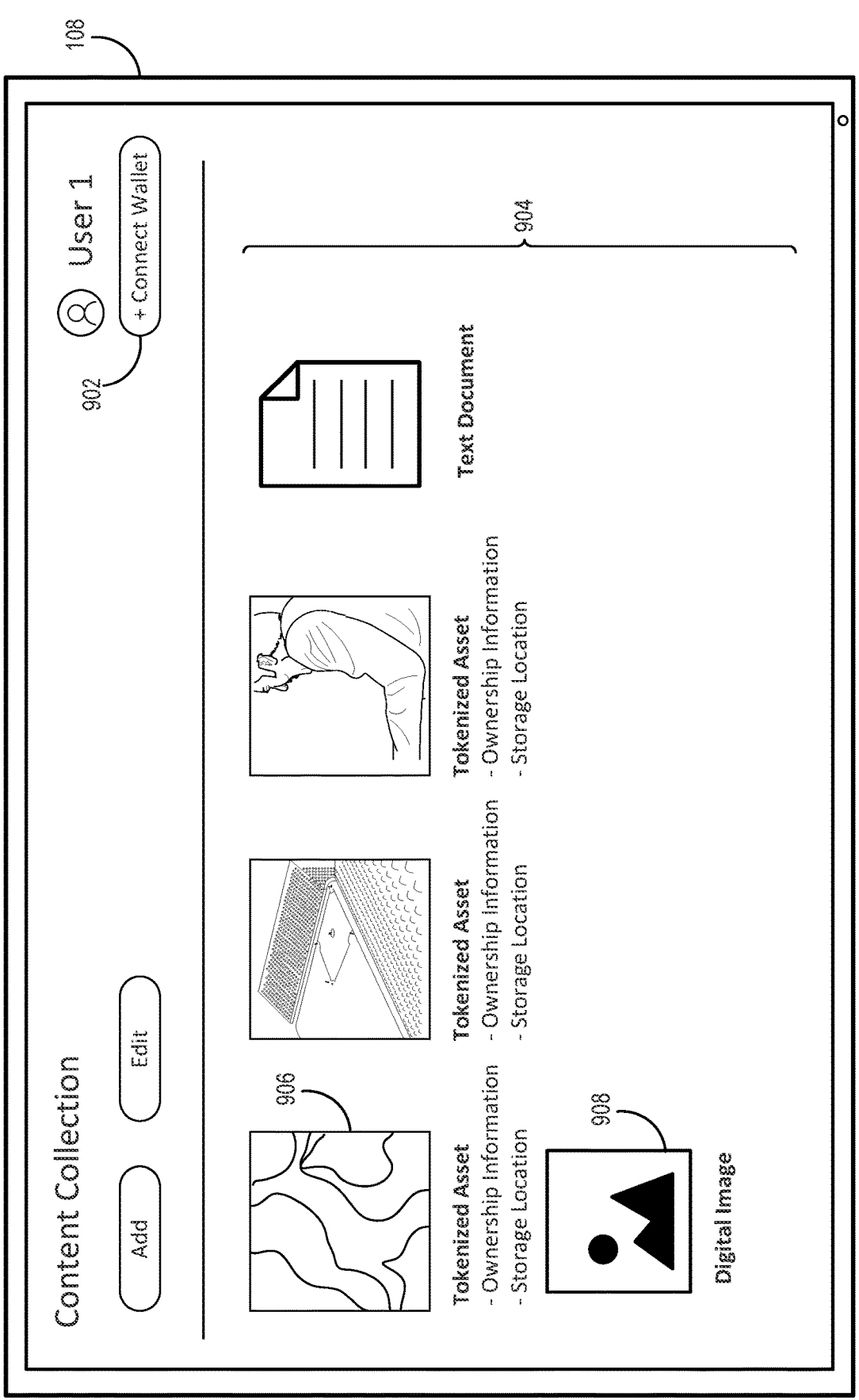
FIG. 9 illustrates an example content collection interface including one or more tokenized assets in accordance with one or more embodiments.

As mentioned, in certain described embodiments, the tokenized asset system 102 generates a content collection that includes a tokenized asset. In particular, the tokenized asset system 102 analyzes content items associated with a user account within the content management system 106 and generates a content collection that includes non-tokenized-asset content items and tokenized assets within a single content collection. FIG. 9 illustrates a content collection that includes tokenized assets in accordance with one or more embodiments.

As illustrated in FIG. 9, the client device 108 displays a content collection 904. In particular, the tokenized asset system 102 generates the content collection 904 by identifying content items and tokenized assets associated with the user account User 1. For instance, the tokenized asset system 102 automatically searches for, detects, or identifies content items to include within the content collection 904, such as content items relating to a common user account (e.g., User 1), content items relating to a common project, content items associated with a common location, content items shared among common user accounts, and/or content items designated as part of a common collection (e.g., added to the content collection by the user account User 1).

As shown, the tokenized asset system 102 further distinguishes between the different types of content items within the content collection 904 (or within a common folder). Specifically, the tokenized asset system 102 identifies digital images, digital documents, tokenized assets, and other types of content items within the content collection 904. The tokenized asset system 102 further treats each type of content item differently by, for instance, presenting a thumbnail view of a digital image, providing a document icon for a digital document, and/or presenting a visual representation of a tokenized asset. Indeed, the tokenized asset system 102 generates and utilizes different visual formats for different types of digital content—e.g., a first visual format for a digital image and a second visual format for a tokenized asset.

To elaborate on visual formats, the tokenized asset system 102 identifies the tokenized asset 906 and the digital image 908 within the content collection 904. The tokenized asset system 102 provides a digital image icon (or a thumbnail of a digital image) to represent the digital image 908 within the content collection interface. By contrast, the tokenized asset system 102 generates and provides a visual representation of the tokenized asset 906 that is specific to tokenized assets. For example, the tokenized asset system 102 provides a visual representation such as an image or an animation representing the tokenized asset, together with an asset name ("Tokenized Asset"), ownership information, a storage location indicator, and/or other tokenized asset data. Indeed, even within the same content collection 904 the tokenized asset system 102 can customize presentation of content items to visually portray tokenized assets differently from other types of content items.

As further illustrated in FIG. 9, the tokenized asset system 102 provides a wallet connection option 902. In particular, the tokenized asset system 102 provides the wallet connection option 902 as a selectable interface element for connecting a tokenized asset wallet. Indeed, based on user interaction selecting the wallet connection option 902, the tokenized asset system 102 can connect a tokenized asset wallet to the user account User 1 within the content management system 106. For example, the tokenized asset system 102 can connect a tokenized asset wallet that includes payment information for performing transactions such as purchases and transfers of tokenized assets such as NFTs and cryptocurrencies. Thus, the tokenized asset wallet can be accessible directly from content collections or other interfaces associated with the content management system 106 without needing to navigate externally to outside systems to access tokenized assets or tokenized asset wallets. In some cases, the tokenized asset system 102 facilitates performing transactions using the tokenized asset wallet within the content management system 106 and/or within the third party content system 114 or some other platform for purchasing or transacting tokenized asset (or other digital content).

By managing tokenized assets with other digital assets via a content management system, the tokenized asset system 102 can provide additional functionalities and features. For example, the tokenized asset system 102 can perform digital queries of a content management system and return tokenized assets and/or non-tokenized assets. Moreover, the tokenized asset system 102 can utilize the content management system to store tokenized assets, creating a decentralized storage location for digital content referenced on the blockchain. Indeed, the content management system can provide a permanent, decentralized location for a digital image, with a reference within the blockchain to the decentralized location. Accordingly, the content management system can provide a cohesive, unified platform for creating, storing, searching, and accessing tokenized and non-tokenized assets.

Digital Passports and Gating

Figure 10:
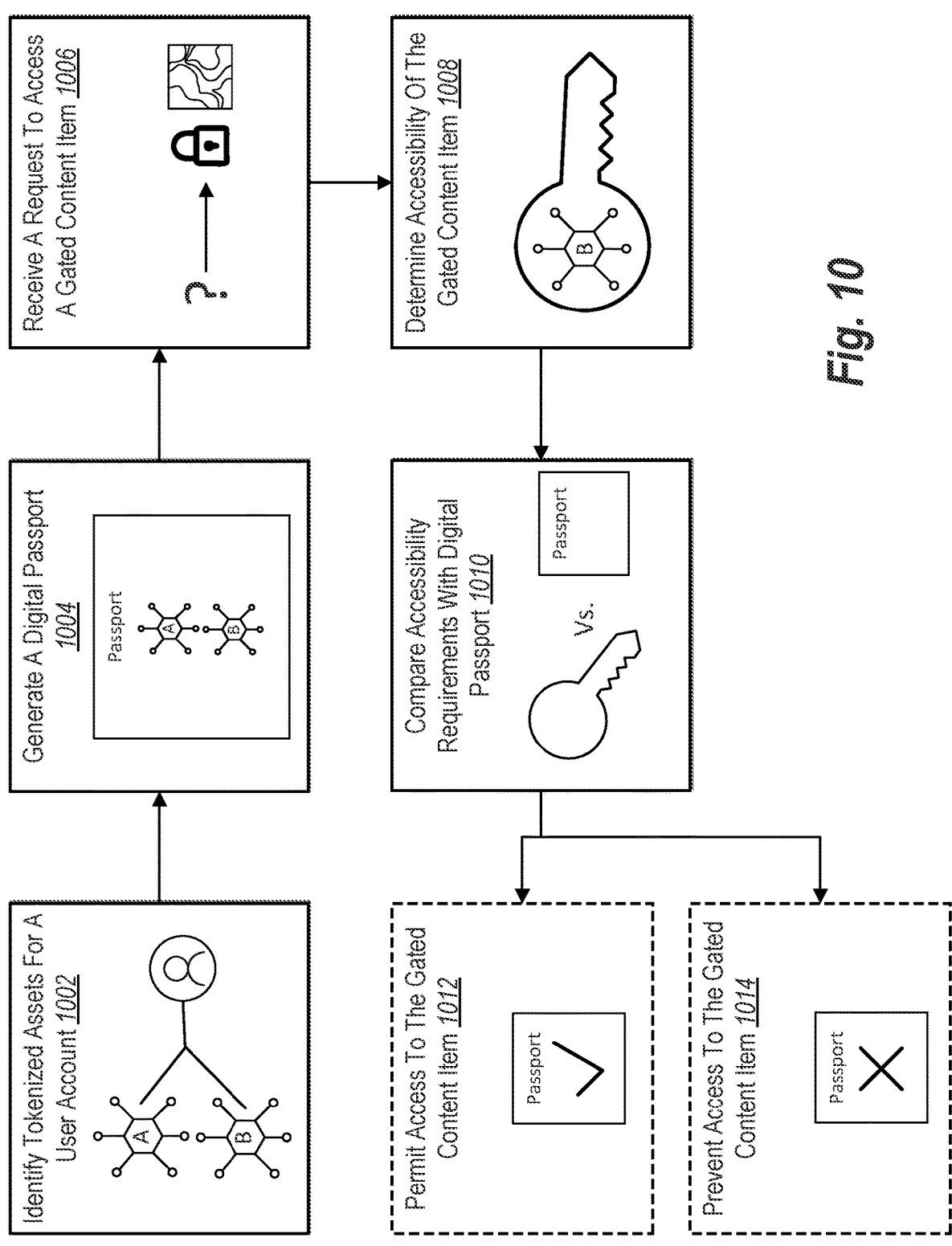
FIG. 10 illustrates an overview of identifying tokenized assets associated with a user account for permitting access to gated content in accordance with one or more embodiments.

As mentioned above, in certain described embodiments, the tokenized asset system 102 facilitates management and use of tokenized assets created and/or hosted across various platforms within a single, centralized location of the content management system 106. In particular, the tokenized asset system 102 can generate a digital passport associated with a user account, where the digital passport acts as a centralized authentication source for different platforms or systems. In some cases, the tokenized asset system 102 can further facilitate access to gated content items utilizing one or more tokenized assets associated with a user account within the content management system 106. FIG. 10 illustrates an example overview of generating a digital passport and facilitating access to gated content using tokenized assets in accordance with one or more embodiments. Additional detail regarding the various acts in FIG. 10 is provided thereafter with reference to subsequent figures.

As illustrated in FIG. 10, the tokenized asset system 102 performs an act 1002 to identify tokenized assets for a user account. More particularly, the tokenized asset system 102 searches through a content management system 106 and through third party systems (e.g., third party content systems and third party tokenized asset systems) linked to a user account to identify tokenized assets such as NFTs and cryptocurrencies associated with the user account. As shown, the tokenized asset system 102 identifies a tokenized asset A and a tokenized asset B associated with a user account.

In addition, the tokenized asset system 102 performs an act 1004 to generate a digital passport. For instance, the tokenized asset system 102 generates a digital passport by collecting, gathering, grouping, or identifying tokenized assets associated with a user account. In some cases, the tokenized asset system 102 generates the digital passport in the form of a passport interface element that presents or visually portrays the tokenized assets together in a single interface location. As shown, the tokenized asset system 102 generates a digital passport that includes the tokenized asset A and the tokenized asset B.

As also shown in FIG. 10, the tokenized asset system 102 performs an act 1006 to receive a request to access a gated content item. To elaborate, the tokenized asset system 102 receives an indication of a user account requesting access to a gated content item within the content management system 106 or within an outside system such as the third party content system 114. For instance, the tokenized asset system 102 receives a request directly from the client device 108 or from the third party content system 114 indicating a request from the client device 108 to access a content item that is gated by a tokenized access gate that requires one or more tokenized assets for access.

Based on the request to access the gated content item, as shown in FIG. 10, the tokenized asset system 102 performs an act 1008 to determine accessibility of the gated content item. For example, the tokenized asset system 102 determines or identifies one or more tokenized assets required to gain access to the gated content item. In some cases, the tokenized asset system 102 determines additional factors, such as a relationship that a user account must have with one or more tokenized assets to gain access, such as current ownership of the tokenized asset, previous ownership of the tokenized asset, creatorship of the tokenized asset, or some other relation with the one or more tokenized assets. In one or more embodiments, the tokenized asset system 102 determines that a relationship (e.g., ownership) with a tokenized asset satisfies a threshold duration of time. In some implementations, the tokenized asset system 102 identifies content gating requirements for the gated content item as set by one or more user accounts, including a collaborative content item that is gated by multiple user accounts, each specifying separate access requirements (e.g., separate tokenized assets required to permit access).

As further illustrated in FIG. 10, the tokenized asset system 102 performs an act 1010 to compare accessibility requirements with a digital passport. To elaborate, the tokenized asset system 102 compares the tokenized asset(s) required to access a gated content item with one or more tokenized assets associated with a user account within the content management system 106. In certain embodiments, the tokenized asset system 102 compares the tokenized assets within a digital passport to tokenized assets gating the content item. Based on the comparison, the tokenized asset system 102 determines whether the user account is permitted to access the gated content item. For instance, the tokenized asset system 102 analyzes the distributed ledger of the blockchain to determine a blockchain key associated with (or granted permission to access) the gated content item. Additionally, the tokenized asset system 102 resolves the blockchain key (for a blockchain account) to the user account to determine whether the user account can access the gated content item (e.g., by verifying entry of a smart contract on the distributed ledger indicating the relationship between the tokenized asset and the blockchain key).

As further illustrated in FIG. 10, the tokenized asset system 102 either performs an act 1012 to permit access to the gated content item or performs an act 1014 to prevent access to the gated content item. For example, the tokenized asset system 102 performs the act 1012 by determining that the user account is associated with a tokenized asset required to access the gated content item (e.g., by identifying the tokenized asset within a digital passport associated with the user account). The tokenized asset system 102 can further permit access by displaying or presenting the gated content via the client device 108 (e.g., for gated content hosted by the content management system 106) or by providing an indication to the third party content system 114 that the user account is permitted to access the gated content item (e.g., for gated content hosted by the third party content system 114).

Alternatively, the tokenized asset system 102 performs the act 1014 by determining that the user account is not associated with a tokenized asset required to access the gated content item (e.g., by determining that the tokenized asset is not within a digital passport associated with the user account). The tokenized asset system 102 can further prevent access by providing a failure notification via the client device 108 (e.g., for gated content hosted by the content management system 106) or by providing an indication to the third party content system 114 that the user account is not permitted to access the gated content item (e.g., for gated content hosted by the third party content system 114).

Figure 11:
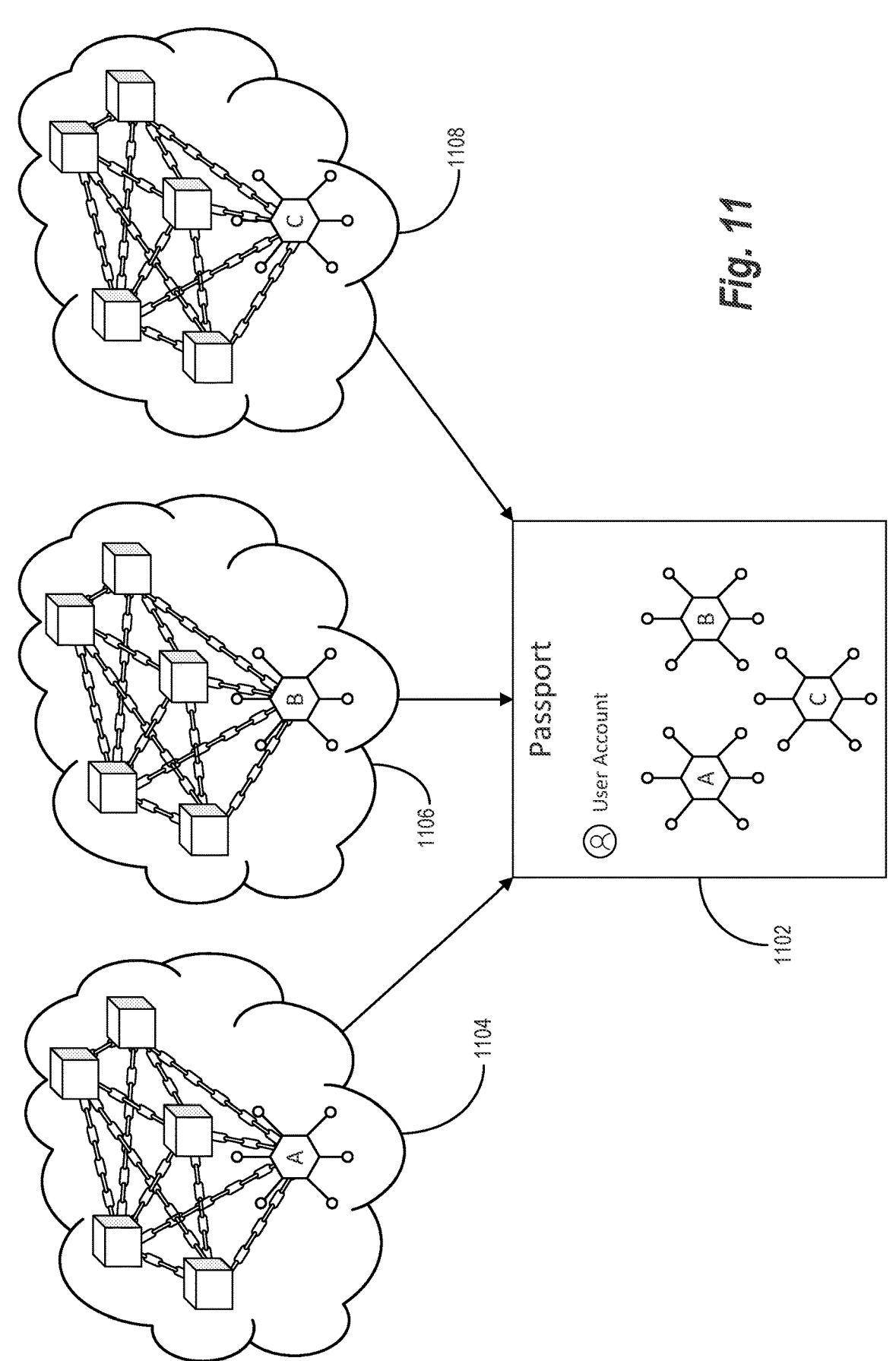
FIG. 11 illustrates an example diagram for generating a digital passport in accordance with one or more embodiments.

As mentioned above, in certain described embodiments, the tokenized asset system 102 generates a digital passport for a user account within the content management system 106. In particular, the tokenized asset system 102 identifies tokenized assets associated with the user account from various tokenized asset platforms to include within the digital passport. FIG. 11 illustrates an example depiction of generating a digital passport in accordance with one or more embodiments.

As illustrated in FIG. 11, the tokenized asset system 102 generates a digital passport 1102 for a particular user account. For example, the tokenized asset system 102 identifies a first tokenized asset A associated with the user account from the blockchain 1104. In addition, the tokenized asset system 102 identifies a second tokenized asset B associated with the user account from the blockchain 1106. Further, the tokenized asset system 102 identifies a third tokenized asset system C associated with the user account from the blockchain 1108. In some cases, the blockchains 1104, 1106, and 1108 are separate blockchains associated with the user account (each with their own respective blockchain keys), and the user account is linked to different platforms for managing the tokenized assets A, B, and C. For instance, the user account purchased the tokenized asset A from a first platform, purchased the tokenized asset B from a second platform, and purchased the tokenized asset C from a third platform, where each platform may have its own separate web interface or application associated with separate system-specific accounts linked to the user account. The tokenized asset system 102 nevertheless identifies the tokenized assets A, B, and C as linked to the user account and collects the tokenized asset A, B, and C into the digital passport 1102.

In some embodiments, the tokenized asset system 102 generates a digital passport in the form of a passport interface element. Indeed, the tokenized asset system 102 generates a passport interface element that includes (for display) indications of one or more tokenized asset associated with the user account, whether the tokenized assets are located within the content management system 106 or within third party systems linked to the user account. The tokenized asset system 102 thus provides a consolidated, centralized location to view, access, and manage tokenized assets associated with a user account.

Figure 12A:
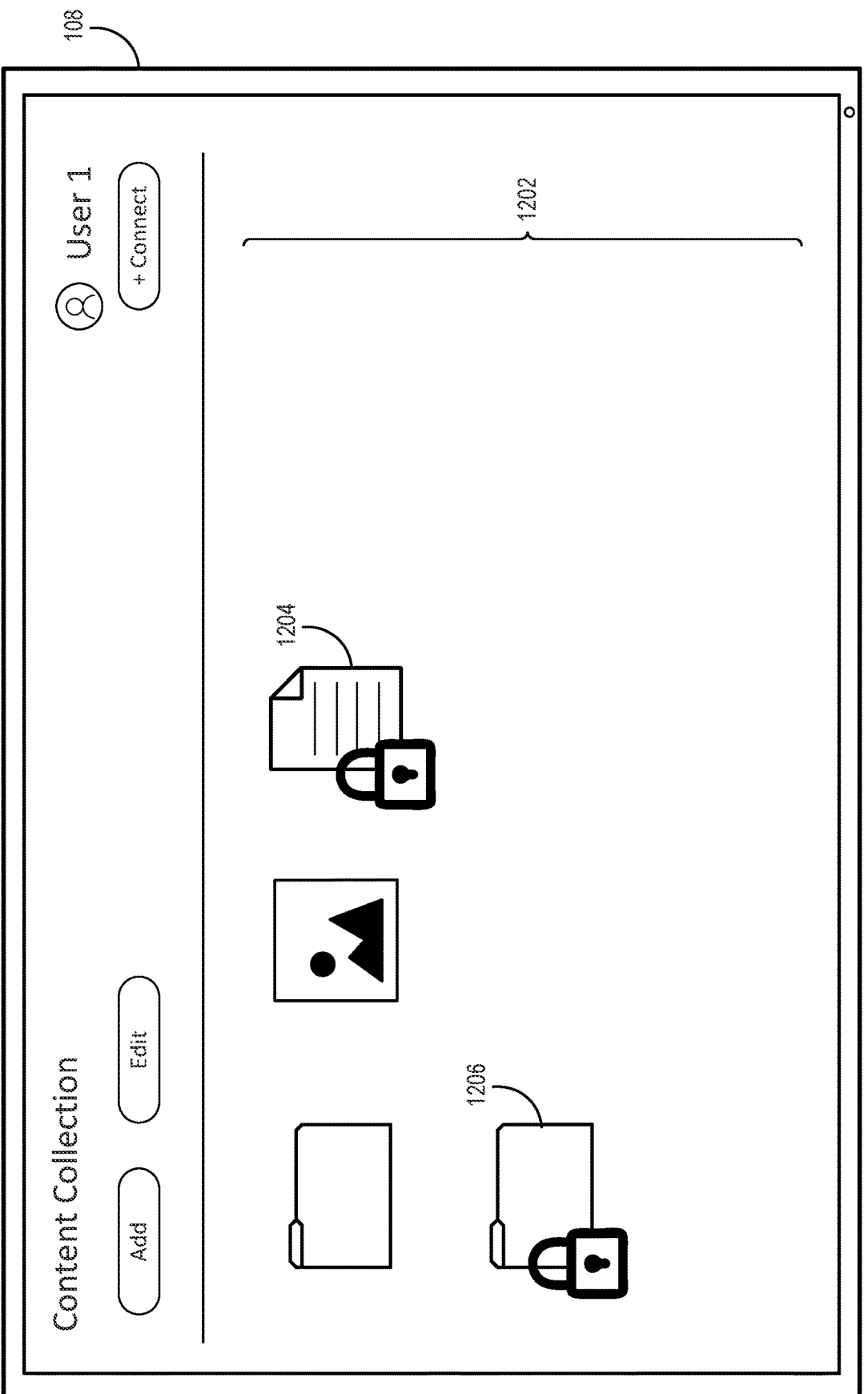
FIGS. 12A-12C illustrate example interfaces including gated content items in accordance with one or more embodiments.
Figure 12B:
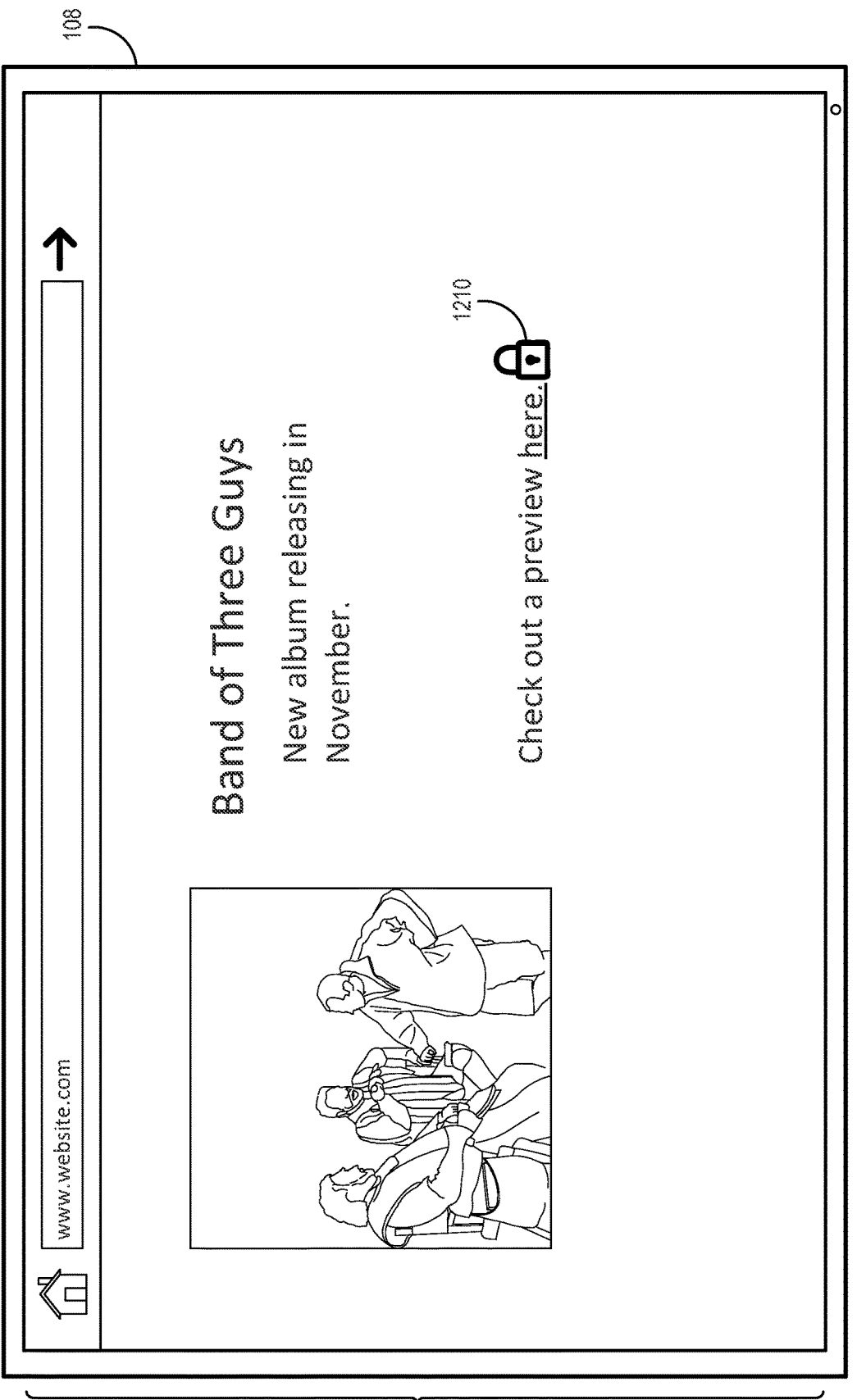
Figure 12C:
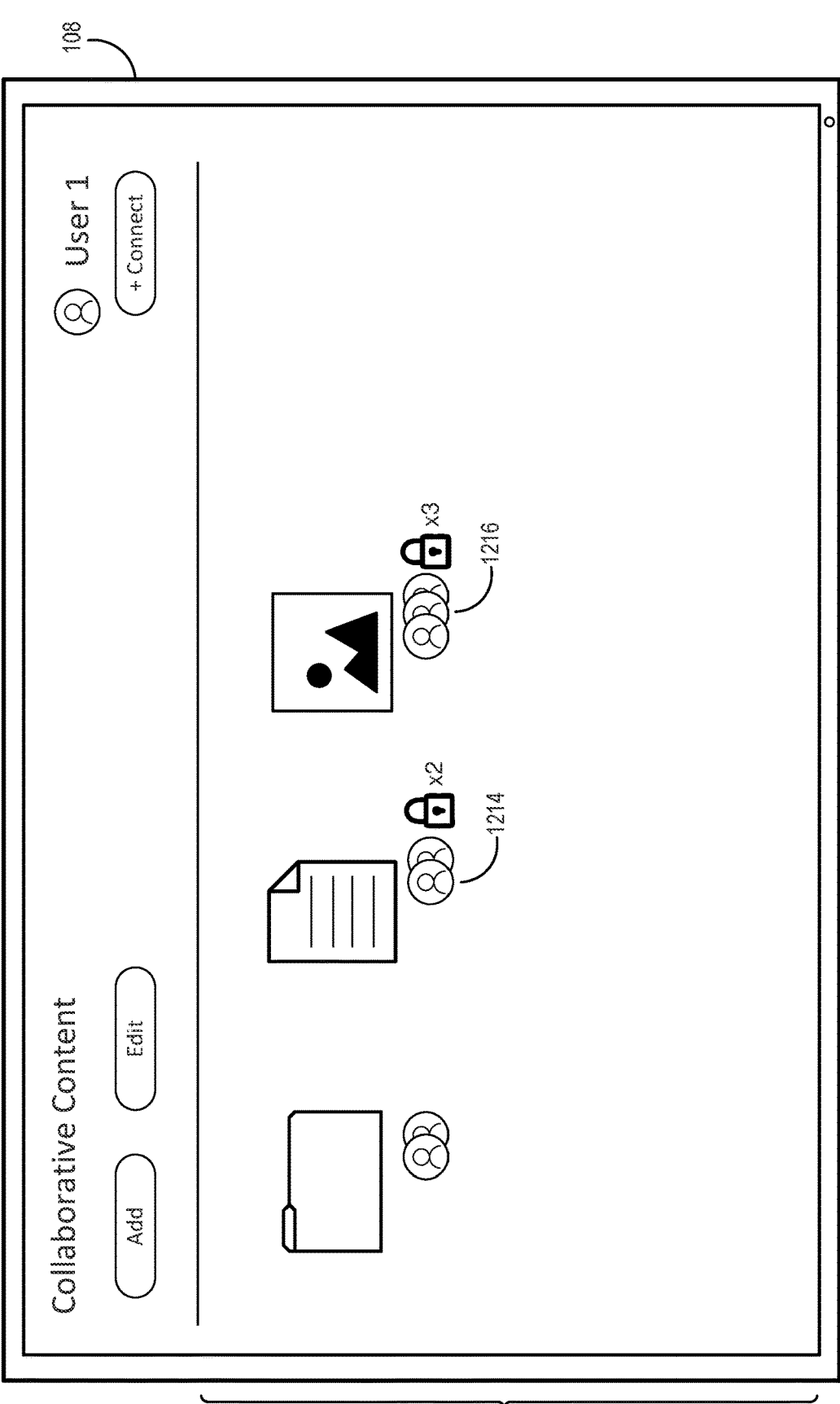

As mentioned, in some embodiments, the tokenized asset system 102 identifies gated content items. In particular, the tokenized asset system 102 determines or identifies a folder, a content collection, a website, a digital image, or some other content item with a tokenized gate preventing or restricting access by requiring one or more tokenized assets. FIGS. 12A-12C illustrate different types of gated content items in accordance with one or more embodiments.

As illustrated in FIG. 12A, the client device 108 displays a content collection 1202 within the content management system 106 that includes content items (both gated and non-gated), such as a folder, a digital image, and two gated content items: the gated content item 1204 and the gated content item 1206. As shown, the gated content item 1204 is a gated digital document, and the gated content item 1206 is a gated folder that includes one or more content items therein. In certain implementations, the tokenized asset system 102 blurs or otherwise obscures all or part of the gated content item 1204 and/or the gated content item 1206. For instance, the tokenized asset system 102 prevents unauthorized user accounts from even viewing previews, file types, icons, or other information about the gated content item 1204 and/or the gated content item 1206 until determining that the user accounts are permitted access. In one or more embodiments, the tokenized asset system 102 gates an entire content collection (e.g., the content collection 1202) and blurs or obscures each content item within the entire gated collection until determining access for the collection.

In some cases, the tokenized asset system 102 receives a request to access the gated content item 1204 and/or the gated content item 1206. For example, the tokenized asset system 102 receives an indication of a user interaction selecting the gated content item 1204 or the gated content item 1206. In response to the request, the tokenized asset system 102 determines whether the user account associated with the client device 108 (e.g., User 1) is permitted to access the gated content. Specifically, the tokenized asset system 102 compares a digital passport associated with the user account to determine whether the digital passport includes a tokenized asset that permits access (e.g., as designated by a content gate set by an administrator account or a creator account).

In some cases, the tokenized asset system 102 verifies ownership (or some other relationship) via a blockchain. For instance, the tokenized asset system 102 analyzes the distributed ledger of the blockchain to identify a transaction or a smart contract that indicates (a particular relationship between the tokenized asset and) a blockchain key associated with the user account. In response to determining that the digital passport includes a tokenized asset that permits access, the tokenized asset system 102 further permits the user account to access the gated content (e.g., to view the gated content item 1204 or to open the folder of the gated content item 1206).

As illustrated in FIG. 12B, the client device 108 displays a website 1208 that includes a link 1210 to a gated content item (e.g., an additional website, a media viewer, or a downloadable content item gated by one or more tokenized assets). In particular, the tokenized asset system 102 identifies the gated content item attached to, or referenced by, the link 1210 and further determines the one or more tokenized assets required to access the corresponding gated content item. In some embodiments, the tokenized asset system 102 receives an indication (e.g., from a third party content system 114 hosting the website 1208 and/or the gated content of the link 1210) of a user interaction selecting the link 1210. In response, the tokenized asset system 102 compares the tokenized gate of the link 1210 with a digital passport associated with the user account of the user requesting access.

Upon determining that the digital passport includes a tokenized asset that permits access, the tokenized asset system 102 provides an indication (e.g., tokenized asset data or other information authenticating a relationship between the user account and the tokenized asset) to the third party content system 114 to permit access to the gated content by the user account. Upon determining that the digital passport does not include a tokenized asset that permits access, the tokenized asset system 102 provides an indication to the third party content system 114 that the user account is not permitted to access the gated content, thereby causing the third party content system 114 to prevent access to the gated content by the user account.

As illustrated in FIG. 12C, the client device 108 displays a collaborative content collection 1212. In particular, the tokenized asset system 102 determines or identifies a collaborative content collection 1212 that includes content items that are associated with, accessible by, and/or modified by, multiple user accounts within the content management system 106. Indeed, the tokenized asset system 102 identifies collaborative content items that are protected by tokenized gates, such as the gated collaborative content item 1214 and the gated collaborative content item 1216.

In some embodiments, the tokenized asset system 102 determines accessibility requirements for the gated collaborative content item 1214 and the gated collaborative content item 1216. As shown, the tokenized asset system 102 determines that the gated collaborative content item 1214 is gated by two separate tokenized assets, while the gated collaborative content item 1216 is gated by three. For example, the tokenized asset system 102 determines that a tokenized gate for a gated collaborative content item (e.g., the gated collaborative content item 1214 or the gated collaborative content item 1216) includes requirements set by multiple collaborative user accounts. For the gated collaborative content item 1214, the tokenized asset system 102 determines that a first collaborative user account sets a requirement of owning a first tokenized asset, and a second collaborative user account sets a requirement of owning a second tokenized asset. Thus, in response to a request to access the gated collaborative content item 1214, the tokenized asset system 102 analyzes a digital passport of the user account to determine whether the user account owns the first tokenized asset and the second tokenized asset.

For the gated collaborative content item 1216, the tokenized asset system 102 determines that a first collaborative user account sets a requirement of owning a tokenized asset within a particular tokenized asset collection, a second collaborative user account sets a requirement of owning any tokenized asset for at least a month, and a third collaborative user account sets a requirement of creating a tokenized asset (or minting a tokenized asset). In response to a request to access the gated collaborative content item 1216, the tokenized asset system 102 thus determines whether a digital passport of the requesting user account includes tokenized assets that satisfy all three requirements of the collaborative users to gain access.

As mentioned, in some cases, a gate for a gated content item specifies particular requirements for accessing (e.g., viewing or otherwise consuming) the gated digital content. For example, the tokenized asset system 102 determines that a specific relationship (e.g., current ownership, previous ownership, or creatorship) between a user account and a tokenized asset is required for access. As another example, the tokenized asset system 102 determines that a tokenized asset must be from a particular collection (or that a user account own a specified number of tokenized assets from a particular collection) and/or that a user account has a certain relationship with a tokenized asset for at least a threshold duration of time. The tokenized asset system 102 can combine one or more different requirements or factors for one or more tokenized assets required to access a gated content item (e.g., in an "and" combination requiring both factors, an "or" combination requiring one or more of the factors, or an "exclusive or" combination requiring only one of the factors but no more). For gated collaborative content items, the tokenized asset system 102 determines different requirements for each tokenized asset associated with the tokenized gate.

In one or more embodiments, the tokenized asset system 102 enforces or implements tokenized gating using a blockchain (e.g., an addition or alternatively to gating logic within the content management system 106). For example, the tokenized asset system 102 writes or modifies transactions or smart contracts within a blockchain to reflect one or more gating rules. In some cases, the tokenized asset system 102 modifies a smart contract to include logic for how a tokenized asset is used to access a tokenized asset (or for what tokenized asset is required to access a tokenized asset). For instance, the tokenized asset system 102 writes logic within smart contracts to indicate dates, numbers, timing, and other gating rules described herein for gating a content item. In certain embodiments, the tokenized asset system 102 maintains the logic for the gating rules external to the blockchain (e.g., within a database) and ties the logic to smart contracts within the blockchain (e.g., by writing smart contracts indicating where to locate gating rules).

As mentioned above, in certain embodiments, the tokenized asset system 102 generates a digital passport for a user account within the content management system 106. In particular, the tokenized asset system 102 generates a digital passport to display as a passport interface element on a client device for accessing and managing tokenized asset systems in a single, centralized location. FIGS. 13A-13D illustrate example versions of a passport interface element in accordance with one or more embodiments.

Figure 13A:
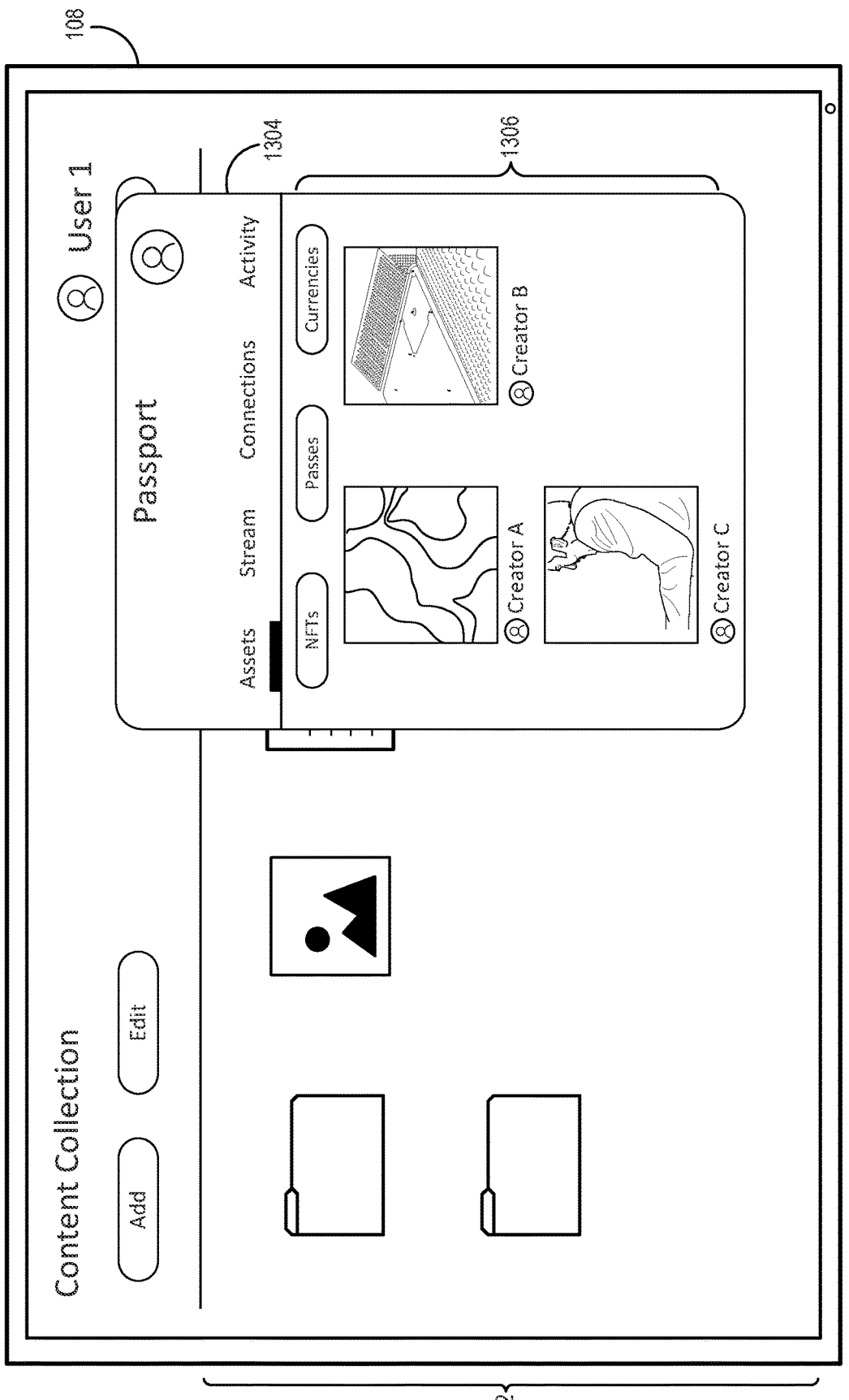
FIGS. 13A-13D illustrate example information within a passport interface element in accordance with one or more embodiments.

As illustrated in FIG. 13A, the client device 108 displays a content collection 1302 and a passport interface element 1304. Indeed, the tokenized asset system 102 generates and provides a content collection 1302 together with a passport interface element 1304 for display within a single user interface. As shown, the passport interface element 1304 is a visual representation of a digital passport associated with the user account User 1. Within the passport interface element 1304, the tokenized asset system 102 provides multiple tabs corresponding to different information or features relating to tokenized assets. For example, the tokenized asset system 102 provides: i) an assets tab for organizing tokenized assets including nonfungible tokens and cryptocurrencies, ii) a stream tab for viewing activity from creators associated with the one or more tokenized assets of the user account, iii) a connections tab for organizing content items and other user accounts connected to the user account via the one or more tokenized assets, and/or iv) an activity tab for viewing an activity history of user account behavior using the one or more tokenized assets.

As shown in FIG. 13A, the tokenized asset system 102 provides an assets tab 1306 for display within the passport interface element 1304. Within the assets tab 1306, the tokenized asset system 102 provides visual representations of one or more tokenized assets associated with the user account, together with tokenized asset data corresponding to the tokenized assets. For instance, the tokenized asset system 102 provides a visual representation of three different tokenized assets, along with indicators of creator accounts that created each of the tokenized assets, respectively (e.g., Creator A, Creator B, and Creator C). Indeed, the tokenized asset system 102 identifies or detects tokenized assets associated with the user account to add to the digital passport and to display within the assets tab 1306.

To identify tokenized assets to include within the digital passport, the tokenized asset system 102 can automatically (e.g., without requiring user interaction to select or locate) locate and add tokenized assets. For instance, the tokenized asset system 102 identifies a first tokenized asset from within the content management system 106 as associated with the user account of User 1, and the tokenized asset system 102 further identifies a second tokenized asset and a third tokenized asset from separate tokenized asset systems or platforms linked to the user account of User 1. In some cases, the tokenized asset system 102 receives user interactions indicating tokenized assets to add to the digital passport. For instance, the tokenized asset system 102 receives an address, a link, or a selection of one or more tokenized assets to import or include (e.g., for individual importing or for batch importing of multiple tokenized assets at a time).

In some cases, the tokenized asset system 102 provides more (or different) tokenized asset data for display within the assets tab 1306 in relation to the tokenized assets. Indeed, the tokenized asset system 102 can connect a tokenized asset wallet associated with a user account (e.g., within the content management system 106 or within a different system). The tokenized asset system 102 can thus incorporate or assimilate the tokenized assets from the connected wallet into the digital passport and can provide visual representations of the tokenized assets within the assets tab 1306.

In one or more embodiments, the tokenized asset system 102 adds tokenized assets based on claiming by a user account. For example, the tokenized asset system 102 determines that a user account has received or been sent a tokenized asset (e.g., from another user account). In response, the tokenized asset system 102 provides a notification to the user account indicating receipt of the tokenized asset (along with an indication of the sending user account) and prompting the user account to accept or claim the tokenized asset. In some cases, the tokenized asset system 102 provides an option to claim a tokenized asset with a particular tokenized asset wallet (e.g., the same wallet currently used by the user account or a different tokenized asset wallet). If the tokenized asset system 102 determines that a recipient account is not registered within the content management system 106, the tokenized asset system 102 provides a prompt to register within the content management system 106 to claim the tokenized asset.

As further shown, the tokenized asset system 102 provides selectable elements to view different types of tokenized assets associated with the user account. For example, the tokenized asset system 102 provides a selectable option to view NFTs, a selectable option to view passes (e.g., tokenized passes that grant access to events and/or gated content within the content management system 106 or within the third party content system 114), and a selectable option to view currencies (e.g., cryptocurrencies). In some cases, the visual representations of the tokenized assets within the assets tab 1306 are selectable and moveable to, for example, add a tokenized asset to the content collection 1302 (e.g., via a click and drag movement), whereupon the tokenized asset system 102 adds (or moves) a visual representation of a tokenized asset, along with its tokenized asset data, to the content collection 1302.

Figure 13B:
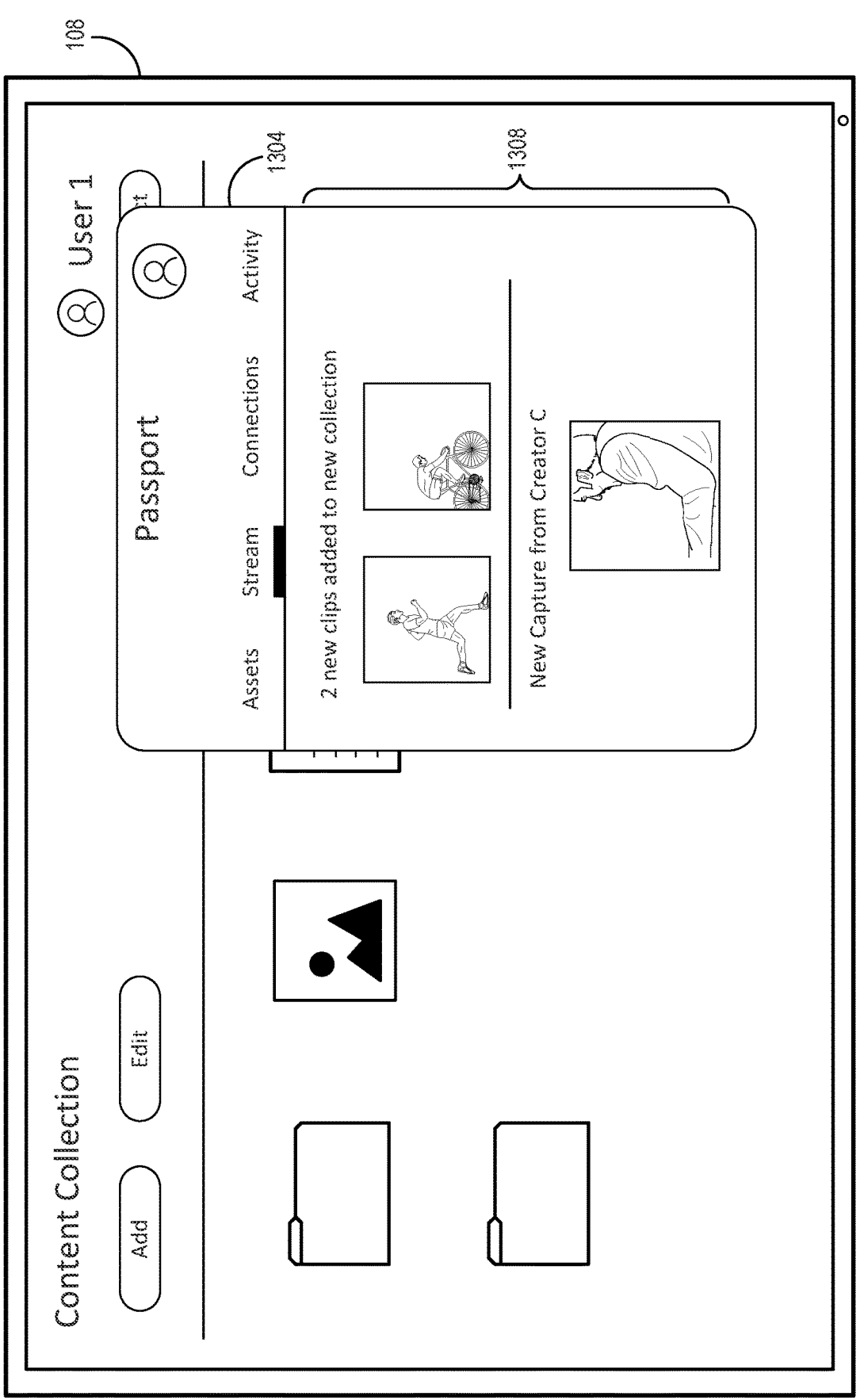

As illustrated in FIG. 13B, the client device 108 displays a stream tab 1308 of the passport interface element 1304. For example, the tokenized asset system 102 provides the stream tab 1308 for display based on user interaction selecting the stream tab 1308 from within the passport interface element 1304. As shown, the tokenized asset system 102 provides visual representations of internet or computer/digital item access activity associated with tokenized assets within the digital passport of the user account. More specifically, the tokenized asset system 102 determines or identifies other user accounts (either within the content management system 106 or within other systems such as the third party content system 114) associated with a tokenized asset within the digital passport. For instance, the tokenized asset system 102 identifies creator user accounts that created tokenized assets owned by the user account User 1. As another example, the tokenized asset system 102 identifies other user accounts that own tokenized assets within a common collection within the content management system 106 (or within a common set of tokenized assets created by a common creator account) of tokenized assets owned (or viewed or created or shared or previously owned) by the user account User 1.

In addition, the tokenized asset system 102 detects or determines internet activity associated with the other user accounts, such as blog entries, social media posts, digital videos, or other online content relating to tokenized asset (or relating to user accounts linked to the tokenized assets). For example, the tokenized asset system 102 identifies a video posted to a social media feed of a tokenized asset creator who created a tokenized asset within the digital passport. The tokenized asset system 102 further provides visual representations of the internet activity for display within the stream tab 1308 of the passport interface element 1304. As shown, the tokenized asset system 102 provides a visual representation of a new capture from Creator C.

In some cases, the tokenized asset system 102 detects or determines activity associated with the tokenized assets or activity of content items associated with the tokenized assets. For example, the tokenized asset system 102 identifies a video posted to a social media site that references or tags a tokenized asset within the digital passport. As another example, the tokenized asset system 102 detects modifications to a tokenized asset collection associated with a tokenized asset within the digital passport, such as the addition or creation of a new tokenized asset to the collection. As shown, the tokenized asset system 102 provides visual representations of two new clips added to the new collection.

Figure 13C:
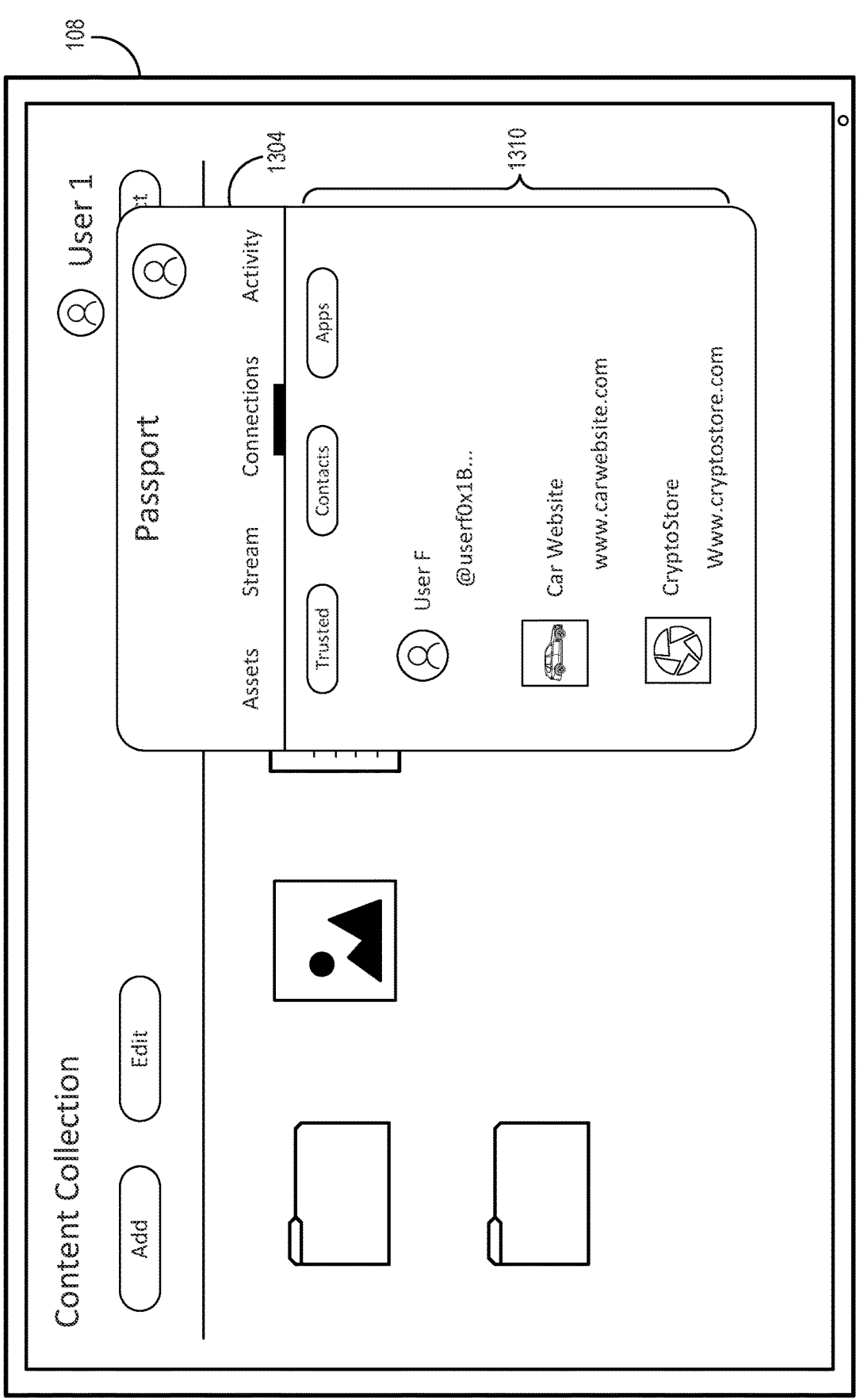

As illustrated in FIG. 13C, the client device 108 displays a connections tab 1310 within the passport interface element 1304. In particular, the tokenized asset system 102 provides the connections tab 1310 for organizing external systems, content items, and other user accounts connected to the digital passport 1304 of user account User 1 (e.g., connected via the one or more tokenized assets). To elaborate, the tokenized asset system 102 identifies systems, applications (e.g., decentralized applications or "DAPs") or content items (e.g., websites) that the user account has previously used and/or accessed utilizing persistent credentials or privileges (e.g., gained access to through the digital passport 1304 by, for example, using the digital passport 1304 to verity ownership of a particular tokenized asset). For example, the tokenized asset system 102 creates a permanent (or semi-permanent) digital handshake between the user account/digital passport 1304 and the accessed system or content item. The tokenized asset system 102 stores or provides information for theses connections or handshakes within the connections tab 1310.

As just mentioned, in one or more embodiments, the tokenized asset system 102 determines or identifies content items, applications, or user accounts connected to (tokenized asset wallets added to) the digital passport. For instance, the tokenized asset system 102 identifies tokenized asset platforms where the tokenized asset wallets were created and includes links to the tokenized asset platforms within the connections tab 1310. Additionally, the tokenized asset system 102 identifies websites where tokenized assets within the digital passport were purchased, user accounts that are previous owners of tokenized assets within the digital passport, and/or websites where tokenized assets within the digital passport were used to make a purchase or to perform some other activity. The tokenized asset system 102 thus provides visual representations of these websites and user accounts within the connections tab 1310. As shown, the connections tab 1310 includes selectable options to view and manage specific types of connections, such as trusted connections, contacts, and apps connected to the digital passport (e.g., connected to one or more tokenized assets within the digital passport).

As further illustrated in FIG. 13C, the tokenized asset system 102 provides, within the connections tab 1310, selectable options to view specific types of connections, including trusted connections, contacts, and connected applications. For instance, the tokenized asset system 102 determines and provides a list of trusted connections that include connections that a user account wishes to be elevated to a level of trust. For example, the tokenized asset system 102 can automatically (e.g., without requiring additional user input to approve or perform) approve requests from, transactions with, or access to the trusted connections. In addition, the tokenized asset system 102 provides a list of contacts within the connections tab 1310 to indicate user accounts or other contact identifications associated with the digital passport 1304 or associated with another tokenized asset wallet with which the digital passport 1304 has interacted (e.g., received tokenized assets from or provided tokenized assets to). Further, the tokenized asset system 102 provides a list of applications within the connections tab 1310 to indicate applications that are currently connected to the digital passport 1304 with a digital handshake (e.g., as verified or established by one or more tokenized assets).

Figure 13D:
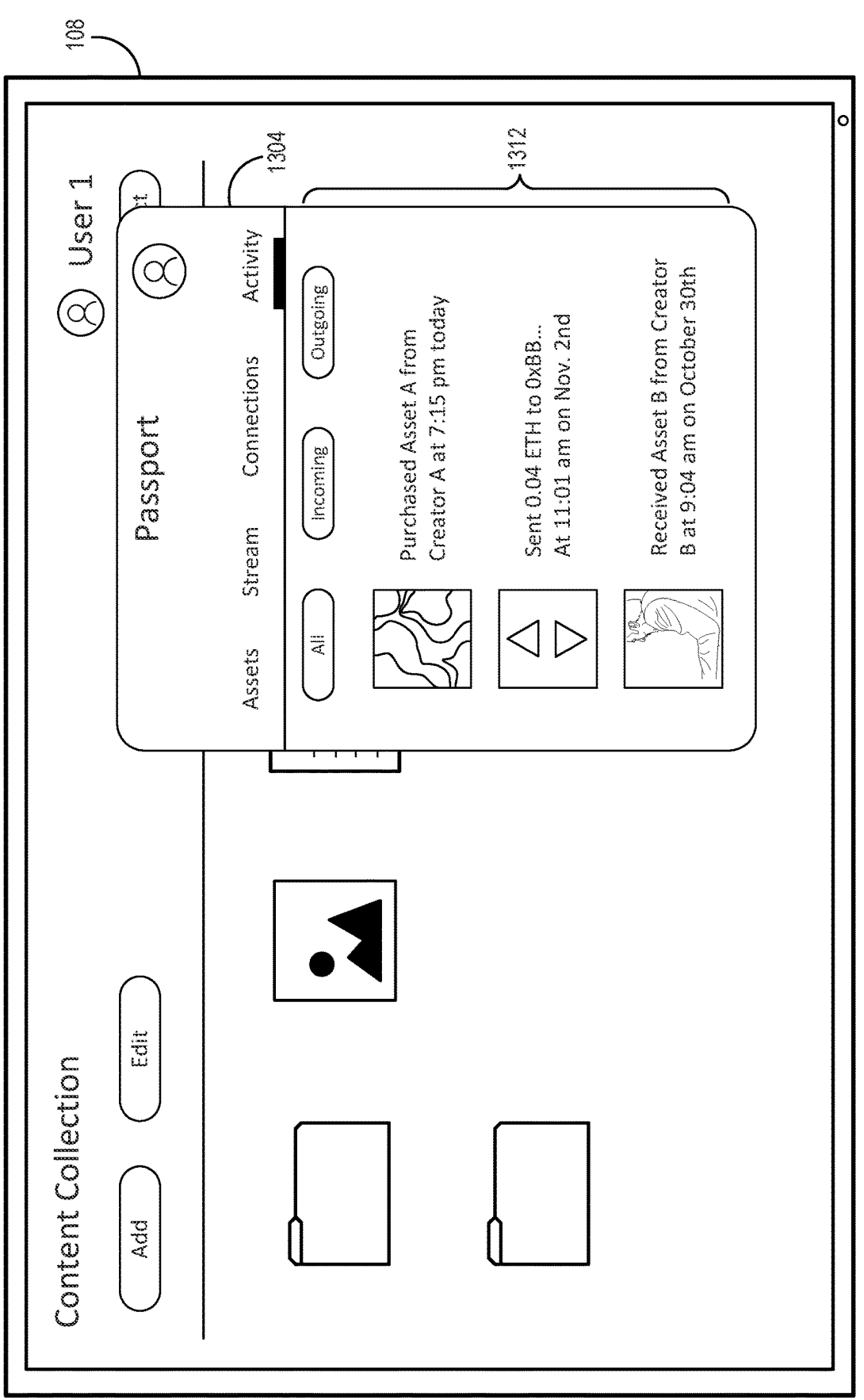

As illustrated in FIG. 13D, the client device 108 displays an activity tab 1312 within the passport interface element 1304. More particularly, the tokenized asset system 102 identifies, monitors, or detects user account activity associated with one or more tokenized assets within a digital passport. For example, the tokenized asset system 102 identifies activity such as purchases, transfers (e.g., receipts and sends), gated content accesses, and other activity pertaining to tokenized assets. The tokenized asset system 102 provides a record of the user account activity for display within the activity tab 1312 of passport interface element 1304.

In some cases, the tokenized asset system 102 further determines and provides contextual information relating to the tokenized asset activity, such as tokenized asset data indicating previous owner accounts and smart contract addresses, along with timestamps associated with the activities. In certain embodiments, the tokenized asset system 102 provides the activity record in a chronological order according to the timestamps indicating when the activities occur. As shown, the tokenized asset system 102 provides visual representations of three tokenized asset activities, a purchase of Asset A from Creator A, a send of 0.04 ETH to a particular smart contract address, and a receipt of Asset B from Creator B.

Figure 14:
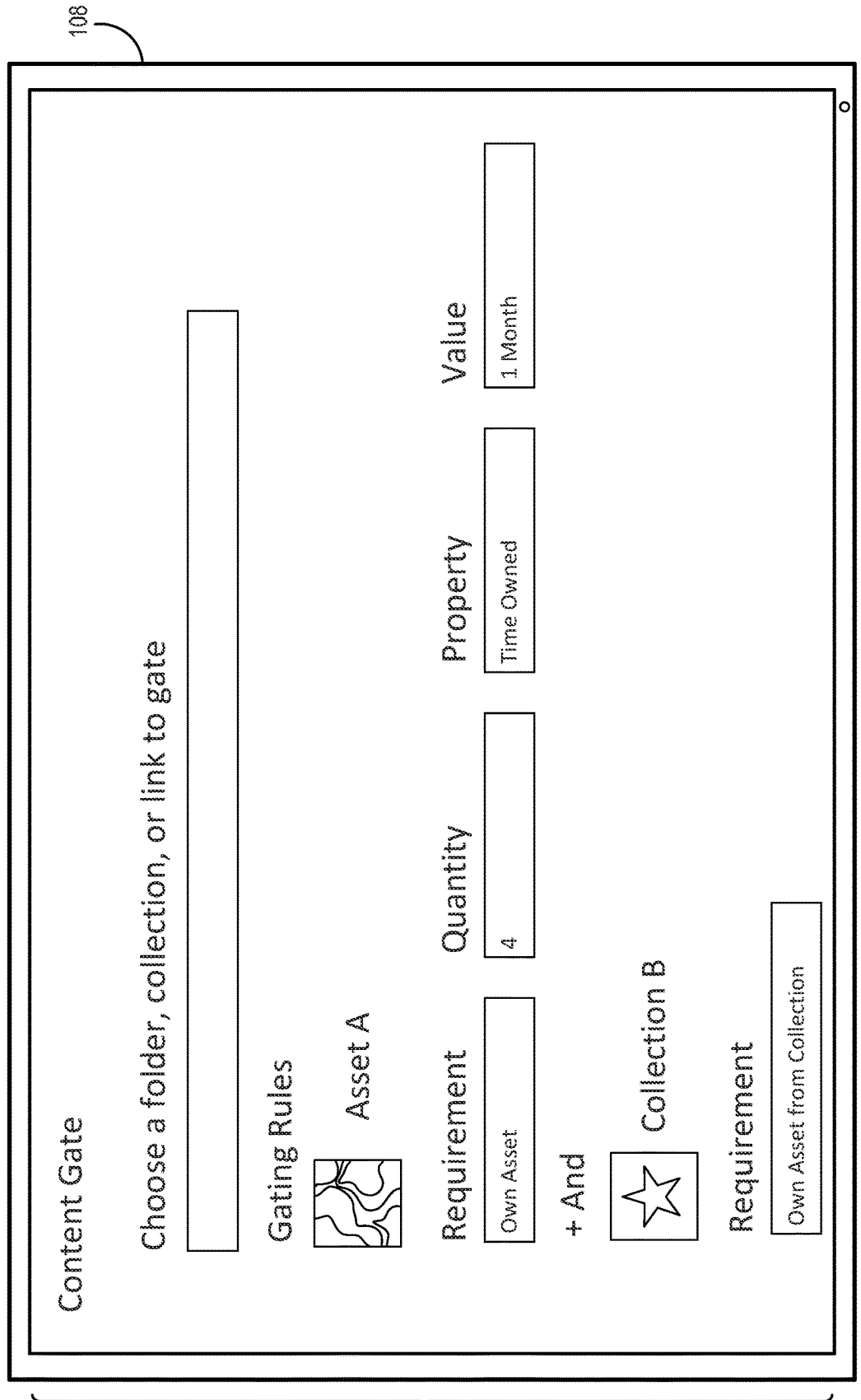
FIG. 14 illustrates a tokenized gating interface for gating digital content in accordance with one or more embodiments.

As mentioned above, in certain described embodiments, the tokenized asset system 102 provides gating tool options for defining tokenized gating rules of a content item. In particular, the tokenized asset system 102 gates or protects a content item based on gating rules set defined by a user account. FIG. 14 illustrates an example tokenized gating interface for defining tokenized gating rules in accordance with one or more embodiments.

As illustrated in FIG. 14, the client device 108 displays a tokenized gating interface 1402. In particular, the tokenized asset system 102 generates and provides the tokenized gating interface 1402 for display on the client device 108. In some cases, the tokenized asset system 102 generates the tokenized gating interface 1402 to include gating tool options to define gating rules for a tokenized asset. For example, the tokenized asset system 102 provides the tokenized gating interface 1402 in response to an indication of user interaction selecting a gating option within a content management interface or within a passport interface element (e.g., for gating a tokenized asset).

In some embodiments, the tokenized gating interface 1402 includes an interactive element for selecting a content item (e.g., folder, a content collection, or a link) to gate with a tokenized gate. In addition, the tokenized gating interface 1402 includes gating options, such as an option to require one or more tokenized assets to gain access to the gated content item. For example, as shown, the tokenized asset system 102 receives an indication of a first gating tool option to set a first gating rule or gating factor associated with Asset A. Specifically, the tokenized asset system 102 receives indications of: i) a requirement associated with Asset A (e.g., ownership of Asset A), ii) a quantity of Asset A that must satisfy the requirement (e.g., ownership of 4 copies or instances of Asset A), iii) a property associated with Asset A (e.g., a time owned or some other asset property such as an asset price or sharing of the asset), and iv) a value associated with the property (e.g., 1 month of ownership required, or a currency amount for an asset price, or a number of shares of the asset).

In addition, the tokenized asset system 102 receives an indication of a second gating tool option to set a second gating rule or gating factor associated with Collection B. For instance, the tokenized asset system 102 receives an indication to require both Asset A and Collection B to gain access to the gated content item. As shown, the tokenized asset system 102 assigns a requirement for Collection B of requiring ownership of a tokenized asset from within Collection B.

While FIG. 14 illustrates requiring both Asset A and Collection B ("+ And"), in certain embodiments the tokenized asset system 102 utilizes conditions other than "and" conditions. For example, the tokenized asset system 102 can set "or" conditions that indicate that the gating rules of Asset A or Collection B (or both) must be met to gain access to the gated content item. In some implementations, the tokenized asset system 102 sets an "exclusive or" condition to require that the gating rules of either Asset A or Collection B, but not both, must be satisfied to gain access to the gated content item. In some cases, the tokenized asset system 102 adds more or fewer gating rules associated with respective tokenized assets or tokenized asset collections.

In one or more implementations, the tokenized asset system 102 determines and applies a timing requirement for a gating rule. For instance, the tokenized asset system 102 determines that a gating rule for accessing a gated content item expires after a threshold period of time—or that a tokenized asset is valid for accessing the gated content item for only a threshold period of time. In some cases, upon expiration of a gating rule, the tokenized asset system 102 unlocks or un-gates the content item to permit access without requiring a tokenized asset. In other cases, a gating rule can include multiple timing rules for different tokenized assets (e.g., where a first tokenized asset expires after a first duration and a second tokenized asset expires of a second duration). Upon expiration of a particular tokenized asset, the tokenized asset system 102 can enforce the gating rule associated with a different tokenized asset that has not yet expired.

In some cases, the tokenized asset system 102 gates digital content in tiers. To elaborate, the tokenized asset system 102 utilizes different gating rules for different subsets of gated content items within a collection of gated content items. For example, the tokenized asset system 102 assigns a first tier requirement (e.g., ownership of a particular tokenized asset) to access a first subset of gated content items, a second tier requirement (e.g., ownership of the same tokenized asset as for the first tier as well as ownership of another tokenized asset) to access a second subset of gated content items, and a third tier requirement (e.g., ownership of both tokenized assets for the first tier and the second tier as well as ownership of a tokenized asset from a particular tokenized asset collection) to access a third subset of gated content items. In some cases, the tokenized asset system 102 manages or maintains nested folders or nested content collections, where the nested folders or collections represent tiers of gated content items—e.g., where a user account is permitted access to a first folder for a first tier, a second folder within the first folder for a second tier, and a third folder within the second folder for a third tier.

As mentioned above, in some embodiments the tokenized asset system 102 gates digital content. Indeed, utilizing one or more of the aforementioned gating rules (e.g., as set by gating tool options), the tokenized asset system 102 can protect or gate digital content by requiring tokenized assets for access to gated content items. For example, the tokenized asset system 102 receives a request to access a gated content item, either from the client device 108 (or some other client device) or from a third party content system 114 hosting a gated content item being accessed by a client device. Based on receiving the request, the tokenized asset system 102 determines whether the user account requesting access is associated with one or more tokenized assets that would permit access to the gated content item.

For instance, the tokenized asset system 102 determines gating rules for the gated content item by identifying one or more tokenized assets required for access. In addition, the tokenized asset system 102 compares the gating rules (or the required tokenized assets) with a digital passport associated with the user account. Upon determining that the digital passport of the user account includes (e.g., indicates ownership of or some other relationship with) a tokenized asset that permits access to the gated content item, the tokenized asset system 102 permits such access (e.g., by providing the gated content item for display or by providing an indication to a third party content system 114 to permit access to the gated content item). In some cases, the tokenized asset system 102 verifies the relationship by checking transactions or smart contracts within a blockchain to identify transactions within the distributed ledger that indicate ownership (or some other relationship) by a particular blockchain key (associated with a user account).

The components of the tokenized asset system 102 can include software, hardware, or both. For example, the components of the tokenized asset system 102 can include one or more instructions stored on a computer-readable storage medium and executable by processors of one or more computing devices. When executed by one or more processors, the computer-executable instructions of the tokenized asset system 102 can cause a computing device to perform the methods described herein. Alternatively, the components of the tokenized asset system 102 can comprise hardware, such as a special purpose processing device to perform a certain function or group of functions. Additionally or alternatively, the components of the tokenized asset system 102 can include a combination of computer-executable instructions and hardware.

Furthermore, the components of the tokenized asset system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the tokenized asset system 102 may be implemented as part of a stand-alone application on a personal computing device or a mobile device.

FIGS. 1-14, the corresponding text, and the examples provide a number of different systems and methods for generating and managing tokenized assets and gated content items. In addition to the foregoing, implementations can also be described in terms of flowcharts comprising acts steps in a method for accomplishing a particular result. For example, FIGS. 15-16 illustrate example series of acts for generating and managing tokenized assets and gated content items.

Figure 15:
FIG. 15 illustrates a flowchart of a series of acts of generating and managing tokenized assets associated with a user account in accordance with one or more embodiments
Figure 15:
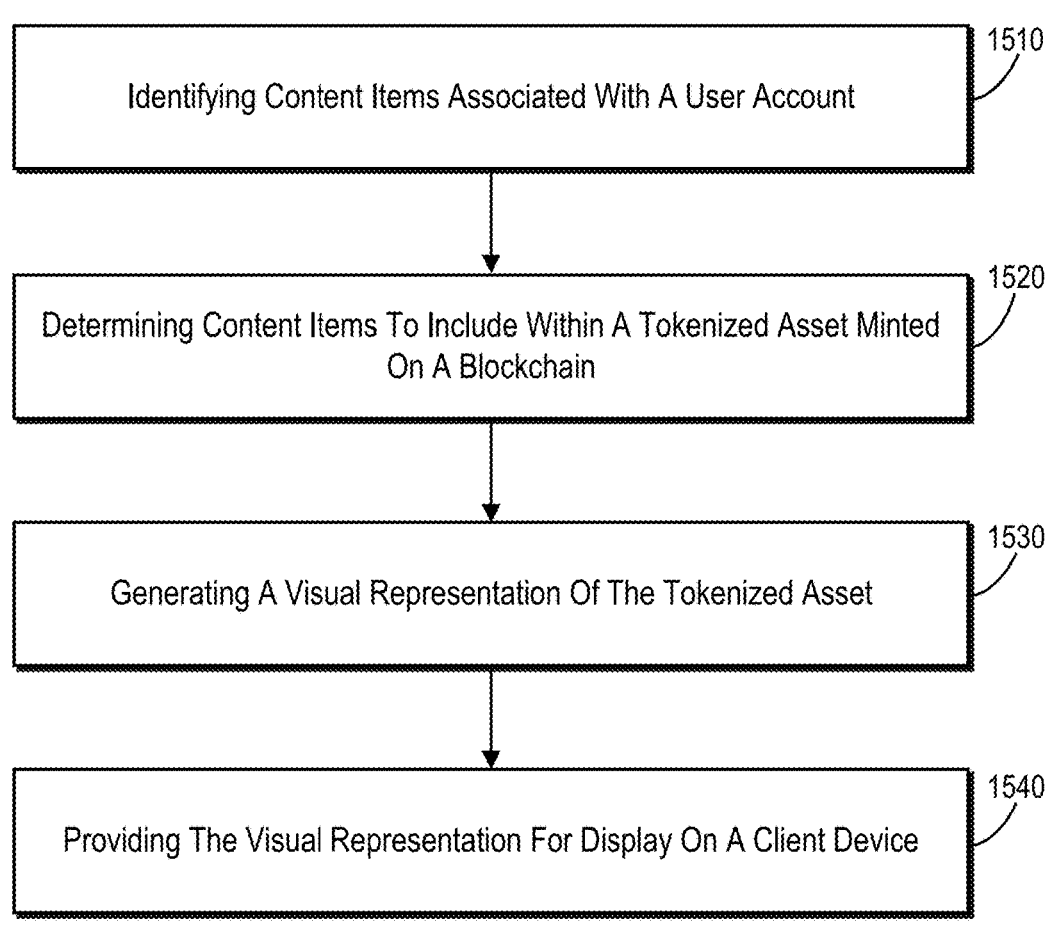
Figure 16:
FIG. 16 illustrates a flowchart of a series of acts of identifying tokenized assets associated with a user account for accessing gated content in accordance with one or more embodiments.
Figure 16:
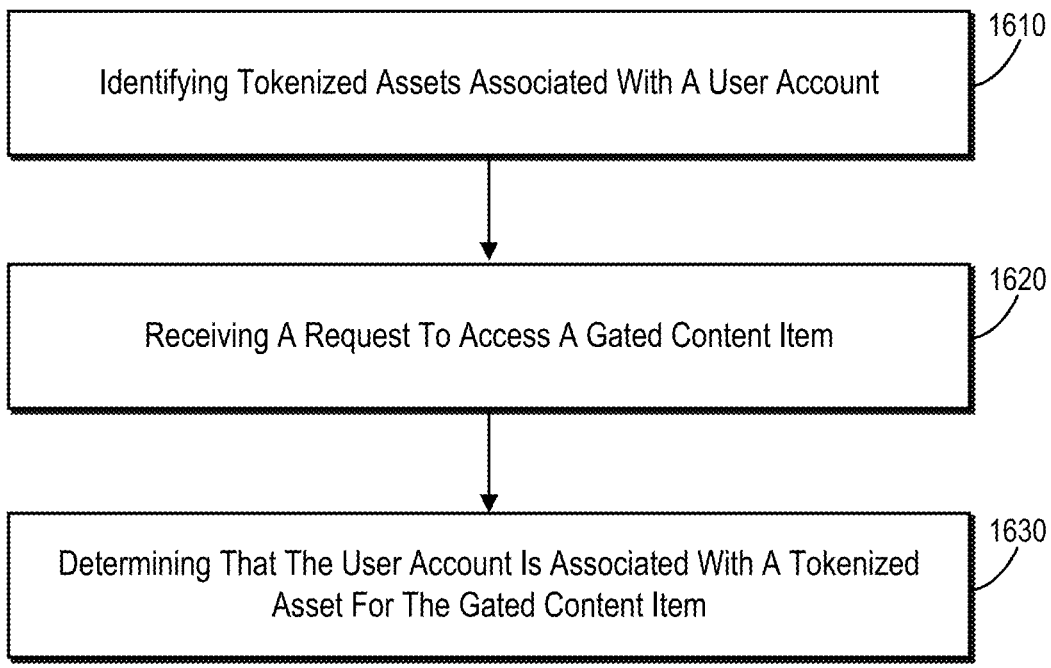

While FIGS. 15-16 illustrate acts according to certain implementations, alternative implementations may omit, add to, reorder, and/or modify any of the acts shown in FIGS. 15-16. The acts of FIGS. 15-16 can be performed as part of a method. Alternatively, a non-transitory computer readable medium can comprise instructions, that when executed by one or more processors, cause a computing device to perform the acts of FIGS. 15-16. In still further implementations, a system can perform the acts of FIGS. 15-16.

As illustrated in FIG. 15, the series of acts 1500 may include an act 1510 of identifying content items associated with a user account. In particular, the act 1510 can involve identifying a plurality of content items associated with a user account of a content management system that synchronizes the plurality of digital content items across multiple client devices associated with the user account. In some cases, the series of acts 1500 includes an act of identifying a plurality of tokenized assets associated with the user account of the content management system and an act of generating a tokenized asset collection for the user account of the content management system and including the plurality of tokenized assets. Further, the series of acts 1500 can include an act of generating a content collection associated with the user of the content management system, the content collection including a content item that is not a tokenized asset and further including the tokenized asset. In some embodiments, the series of acts 1500 can include an act of providing, for display within a content collection interface on the client device, a visual representation of the content item reflecting a first visual format and the visual representation of the tokenized asset reflecting a second visual format.

In addition, the series of acts 1500 can include an act 1520 of determining content items to include within a tokenized asset minted on a blockchain. In particular, the act 1520 can involve determining one or more content items from the plurality of content items to include in a tokenized asset minted using a blockchain and a blockchain key associated with the user account. In some cases, the act 1520 involves receiving a selection of the one or more content items from a content collection within the content management system. In these or other cases, the act 1520 involves determining the one or more content items to include in the tokenized asset by selecting two or more content items from the plurality of content items within the content management system to combine into a combined tokenized asset.

The series of acts 1500 can include an act of minting the tokenized asset from the one or more content items by converting, via the content management system, the one or more content items into tokenized content stored on a blockchain and associated with the user account. Alternatively, the series of acts 1500 can include an act of providing the one or more content items to include within the tokenized asset to an asset minting system for minting the tokenized asset by converting the one or more content items into the tokenized asset stored on a blockchain and associated with the user account. The series of acts 1500 can also include an act of providing a minting option for display on the client device and selectable to cause the tokenized asset to be minted using the blockchain and the blockchain key.

Further, the series of acts 1500 can include an act 1530 of generating a visual representation of the tokenized asset. In particular, the act 1530 can involve generating, via the content management system, a visual representation of the tokenized asset reflecting the one or more content items. In some cases, the series of acts 1500 includes an act of facilitating access to the tokenized asset by third party systems outside of the content management system. The series of acts 1500 can also include act of providing the tokenized asset for purchase via a tokenized asset marketplace within the content management system and/or an act of providing the tokenized asset for purchase via a third party tokenized asset marketplace outside of the content management system.

As further illustrated in FIG. 15, the series of acts 1500 can include an act 1540 of providing the visual representation for display on a client device. In particular, the act 1540 can involve providing the visual representation of the tokenized asset for display within a content management interface on a client device associated with the user account.

In some embodiments, the series of acts 1500 includes an act of determining tokenized asset data associated with the tokenized asset, the tokenized asset data including ownership information indicating the user account associated with the tokenized asset and further including a storage location indicator specifying a storage location of the tokenized asset within a blockchain block explorer. The series of acts 1500 can also include an act of providing the tokenized asset data for display on the client device.

In certain embodiments, the series of acts 1500 includes an act of receiving an indication from the client device to add a content item to the plurality of content items associated with the user account of the content management system. In addition, the series of acts 1500 includes an act of, in response to the indication to add the content item, determining that the content item is a new tokenized asset associated with the user account. Further, the series of acts 1500 includes an act of in response to determining that the content item is a new tokenized asset, determining tokenized asset data for the new tokenized asset, the tokenized asset data including ownership information and a storage location indicator. In some cases, the series of acts 1500 includes an act of providing a visual representation of the tokenized asset together with the tokenized asset data for display on the client device.

In one or more embodiments, the series of acts 1500 includes an act of providing, for display within a content management interface of the content management system presented on the client device, a wallet connection option selectable to connect a tokenized asset wallet within the content management system. Additionally, the series of acts 1500 includes an act of, based on a user interaction selecting the wallet connection option, adding a tokenized asset wallet associated with the user account of the content management system for enabling access to tokenized assets within the tokenized asset wallet by the user account of the content management system.

In some embodiments, the series of acts 1500 includes an act of generating an asset voucher for the tokenized asset utilizing the blockchain key associated with the user account. In addition, the series of acts 1500 includes an act of providing the visual representation of the tokenized asset for display within a tokenized asset marketplace for purchasing the asset voucher and an act of, based on receiving an indication to purchase the asset voucher via the visual representation within the tokenized asset marketplace, causing the tokenized asset to be minted using the blockchain and the blockchain key. Further, the series of acts 1500 includes an act of delay a minting cost associated with minting the tokenized asset until the asset voucher is purchased and the tokenized asset is minted.

In certain implementations, the series of acts 1500 includes an act of providing, for display on the client device, a tokenized asset marketplace interface including visual representations of a plurality of tokenized assets available for purchase via the content management system. Additionally, the series of acts 1500 can include an act of determining tokenized asset data associated with an additional tokenized asset associated with the user account of the content management system, the tokenized asset data including ownership information indicating an owner account of the additional tokenized asset, a storage location indicator specifying a storage location of the additional tokenized asset within a blockchain block explorer, and a ledger history indicating historical transfers of the tokenized asset between owner accounts.

As illustrated in FIG. 16, the series of acts 1600 may include an act 1610 of identifying tokenized assets associated with a user account. In particular, the act 1610 can involve identifying one or more tokenized assets associated with a user account of a content management system. In some cases, the series of acts 1600 further includes an act of providing, for display on a client device associated with the user account, visual representations of the one or more tokenized assets associated with the user account together with tokenized asset data associated with the one or more tokenized assets.

In addition, the series of acts 1600 can include an act 1620 of receiving a request to access a gated content item. In particular, the act 1620 can involve receiving a request by the user account of the content management system to access a gated content item, wherein the gated content item is gated by one or more tokenized gating rules defined within the content management system. For example, the act 1620 can involve receiving an indication from a client device that the user account is requesting access to the gated content item maintained by the content management system. As another example, the act 1620 can involve receiving an indication from a third party content system that the user account is requesting access to the gated content item maintained by the third party content system. In some cases, the act 1620 can involve receiving a request to access protected content within the content management system. In one or more embodiments, the act 1620 involves receiving the request to access the gated content item by receiving a request to access one or more of a website with tokenized gate access, a folder with tokenized gate access, a content collection with tokenized gate access, or an individual content item with tokenized gate access.

Further, the series of acts 1600 includes an act 1630 of determining that the user account is associated with a tokenized asset for the gated content item. In particular, the act 1630 can involve determining, from the one or more tokenized assets associated with the user account and based on the request to access the gated content item, that the user account is associated with a tokenized asset permitting the user account access to the gated content item (e.g., by comparing the one or more tokenized assets with one or more gating rules associated with the gated content item). In some cases, the series of acts 1600 includes an act of determining that the gated content item is accessible to user accounts indicating ownership of the tokenized asset within a blockchain. The act 1630 can also involve permitting the user account to access the gated content item based on determining that the user account owns the tokenized asset.

In some embodiments, the series of acts 1600 includes an act of providing the gated content item for display on a client device associated with the user account based on determining that the user account is associated with the tokenized asset. The series of acts 1600 can also include an act of generating a digital passport for the user account of the content management system. For example, the generating a digital passport can include generating links to blockchain locations for the one or more tokenized assets associated with the user account and grouping the links into a collection accessible by a single passport interface.

In certain implementations, the series of acts 1600 includes an act of generating a digital passport for the user account of the content management system by generating a passport interface element for display on a client device associated with the user account, the passport interface element including one or more of: an assets tab for organizing tokenized assets including nonfungible tokens and cryptocurrencies; a stream tab for viewing activity from creators associated with the one or more tokenized assets of the user account; a connections tab for organizing content items and other user accounts connected to the user account via the one or more tokenized assets; or an activity tab for viewing an activity history of user account behavior using the one or more tokenized assets.

In some cases, the series of acts 1600 includes an act of determining internet activity from creators of the one or more tokenized assets associated with the user account. Additionally, the series of acts 1600 can include an act of providing, for display on a client device associated with the user account, visual representations of events within the internet activity from the creators. The series of acts 1600 can also include acts of determining content items and other user accounts connected to the user account via the one or more tokenized assets and providing, for display on a client device associated with the user account, visual representations of the content items and the other user accounts connected to the user account.

Additionally, the series of acts 1600 can include an act of receiving an additional request by an additional user account to access the gated content item. In some embodiments, the series of acts 1600 can include an act of determining, based on the additional request, that a set of tokenized assets associated with the additional user account does not include the tokenized asset. Further, the series of acts 1600 can include an act of preventing the additional user account from accessing the gated content item based on determining that the set of tokenized assets does not include the tokenized asset. In addition, the series of acts 1600 can include an act of monitoring user account activity associated with the one or more tokenized assets. The series of acts 1600 can also include an act of providing, for display on a client device associated with the user account, a record of the user account activity associated with the one or more tokenized assets.

In certain embodiments, the series of acts 1600 includes an act of receiving an indication from a third party content system that the user account is requesting access to the gated content item maintained by the third party content system. In these or other embodiments, the series of acts 1600 includes an act of, in response to the indication from the third party content system, providing an indication to the third party content system that the user account is associated with the tokenized asset permitting access to the gated content item.

In one or more implementations, the series of acts 1600 includes an act of providing, for display on a client device associated with the user account, gating tool options for defining tokenized gating rules of a content item associated with the user account of the content management system. Additionally, the series of acts 1600 can include an act of providing the gating tool options by providing an option for indicating a specific tokenized asset required for accessing an indicated content item. In some cases, the series of acts 1600 includes an act of providing the gating tool options by providing selectable options for setting quantities and timing rules associated with respective tokenized assets required for accessing an indicated content item.

In one or more embodiments, the series of acts 1600 includes an act of receiving a request by the user account to access an additional gated content item. Further, the series of acts 1600 includes an act of determining that the additional gated content item including a collaboration content item gated by a first tokenized asset set by a first user account and a second tokenized asset set by a second user account. In some cases, the series of acts 1600 includes an act of, based on the request to access the additional gated content item, determine that the user account is associated with the first tokenized asset and the second tokenized asset permitting the user account access to the additional gated content item.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
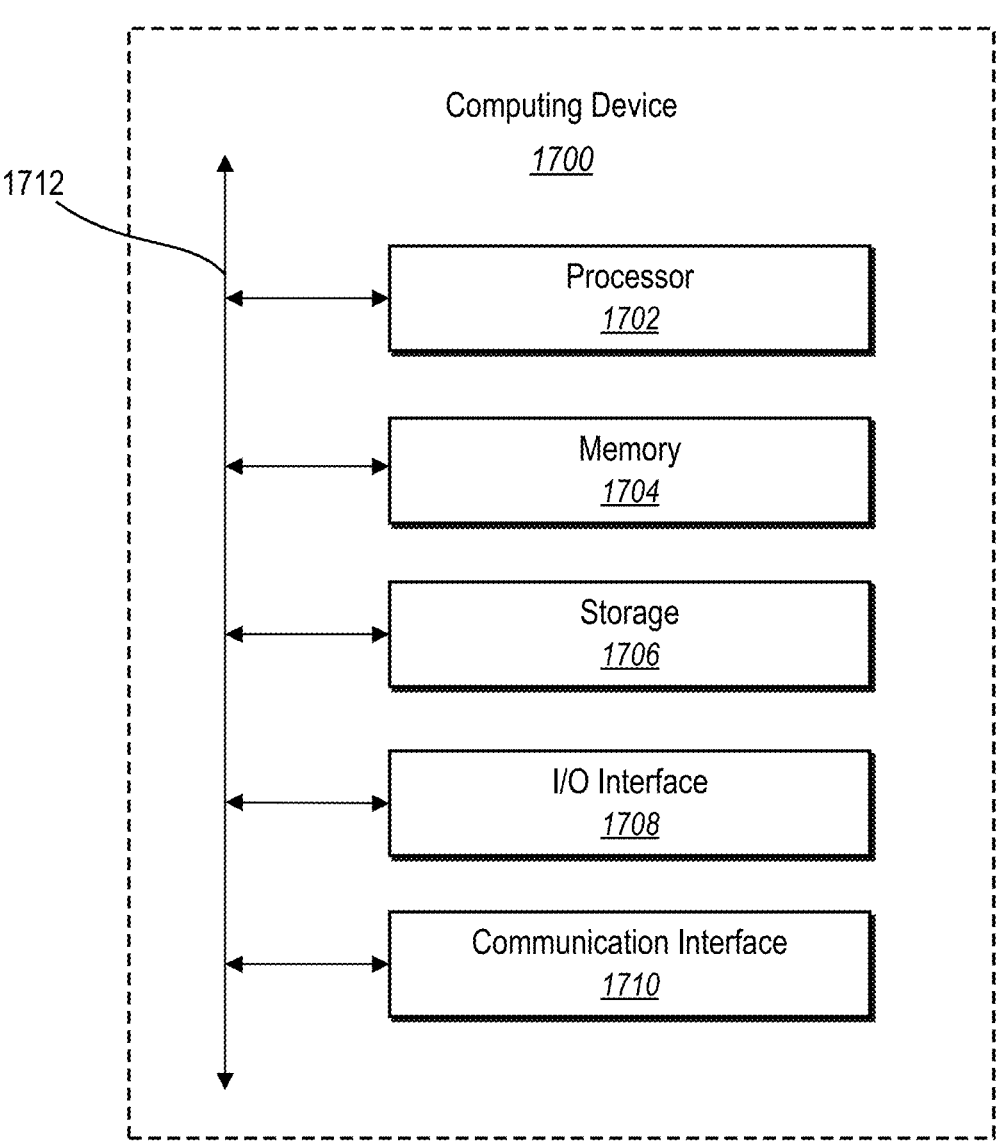
FIG. 17 illustrates a block diagram of an exemplary computing device in accordance with one or more embodiments.

FIG. 17 illustrates a block diagram of exemplary computing device 1700 (e.g., the server(s) 104 and/or the computing device 108) that may be configured to perform one or more of the processes described above. One will appreciate that server(s) 104 and/or the client device 108 may comprise one or more computing devices such as computing device 1700. As shown by FIG. 17, computing device 1700 can comprise processor 1702, memory 1704, storage device 1706, I/O interface 1708, and communication interface 1710, which may be communicatively coupled by way of communication infrastructure 1712. While an exemplary computing device 1700 is shown in FIG. 17, the components illustrated in FIG. 17 are not intended to be limiting. Additional or alternative components may be used in other implementations. Furthermore, in certain implementations, computing device 1700 can include fewer components than those shown in FIG. 17. Components of computing device 1700 shown in FIG. 17 will now be described in additional detail.

In particular implementations, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage device 1706 and decode and execute them. In particular implementations, processor 1702 may include one or more internal caches for data, instructions, or addresses. As an example and not by way of limitation, processor 1702 may include one or more instruction caches, one or more data caches, and one or more translation lookaside buffers (TLBs). Instructions in the instruction caches may be copies of instructions in memory 1704 or storage device 1706.

Memory 1704 may be used for storing data, metadata, and programs for execution by the processor(s). Memory 1704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1704 may be internal or distributed memory.

Storage device 1706 includes storage for storing data or instructions. As an example and not by way of limitation, storage device 1706 can comprise a non-transitory storage medium described above. Storage device 1706 may include a hard disk drive (HDD), a floppy disk drive, flash memory, an optical disc, a magneto-optical disc, magnetic tape, or a Universal Serial Bus (USB) drive or a combination of two or more of these. Storage device 1706 may include removable or non-removable (or fixed) media, where appropriate. Storage device 1706 may be internal or external to computing device 1700. In particular implementations, storage device 1706 is non-volatile, solid-state memory. In other implementations, Storage device 1706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1708 allows a user to provide input to, receive output from, and otherwise transfer data to and receive data from computing device 1700. I/O interface 1708 may include a mouse, a keypad or a keyboard, a touch screen, a camera, an optical scanner, network interface, modem, other known I/O devices or a combination of such I/O interfaces. I/O interface 1708 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1708 is configured to provide graphical data to a display for presentation to a user. The graphical data may be representative of one or more graphical user interfaces and/or any other graphical content as may serve a particular implementation.

Communication interface 1710 can include hardware, software, or both. In any event, communication interface 1710 can provide one or more interfaces for communication (such as, for example, packet-based communication) between computing device 1700 and one or more other computing devices or networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

Communication infrastructure 1712 may include hardware, software, or both that couples components of computing device 1700 to each other. As an example and not by way of limitation, communication infrastructure 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 18:
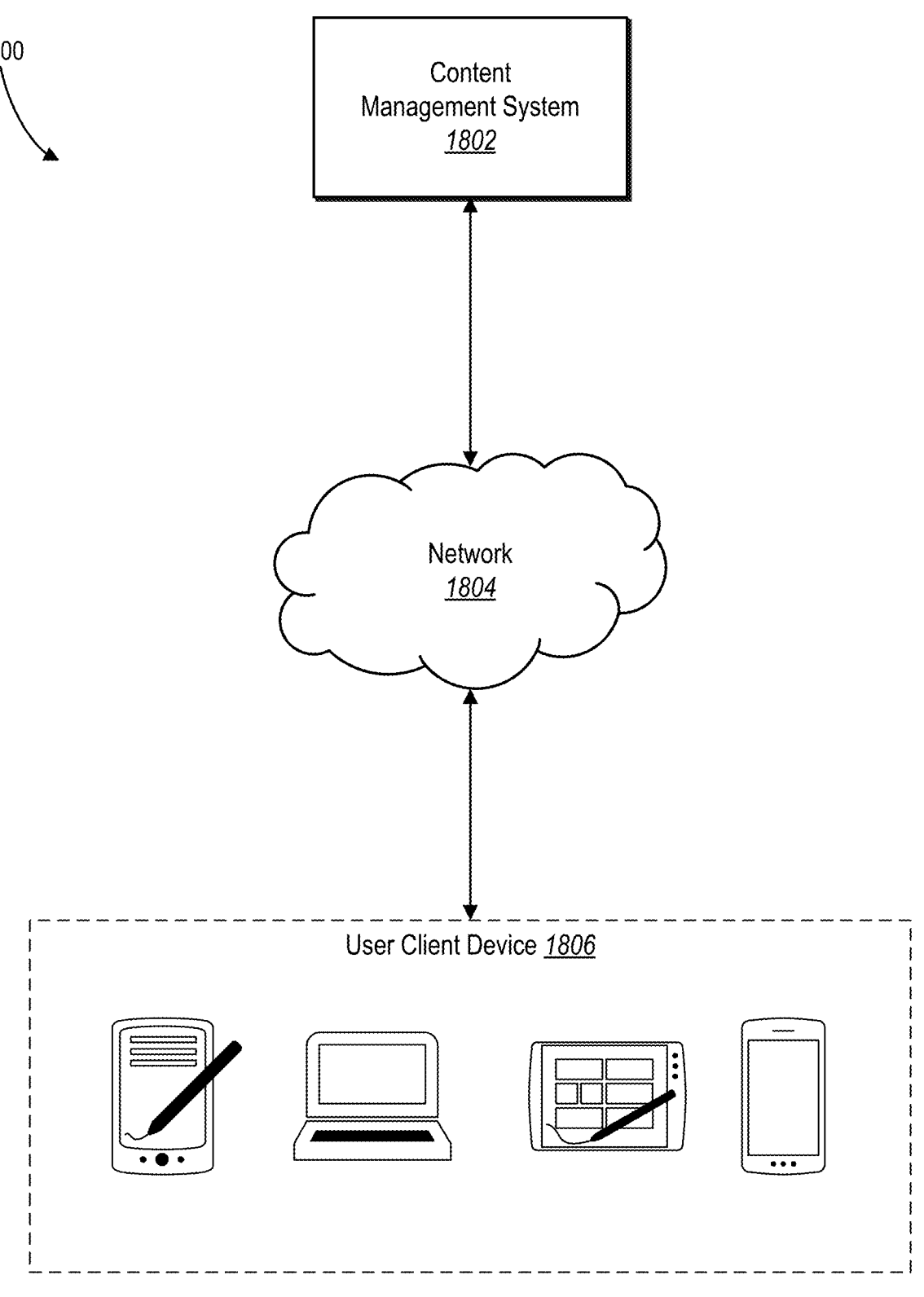
FIG. 18 illustrates an example environment of a networking system having the tokenized asset system in accordance with one or more embodiments.

FIG. 18 is a schematic diagram illustrating environment 1800 within which one or more implementations of the tokenized asset system 102 can be implemented. For example, the tokenized asset system 102 may be part of a content management system 1802 (e.g., the content management system 106). Content management system 1802 may generate, store, manage, receive, and send digital content (such as digital content items). For example, content management system 1802 may send and receive digital content to and from client devices 1806 by way of network 1804. In particular, content management system 1802 can store and manage a collection of digital content. Content management system 1802 can manage the sharing of digital content between computing devices associated with a plurality of users. For instance, content management system 1802 can facilitate a user sharing a digital content with another user of content management system 1802.

In particular, content management system 1802 can manage synchronizing digital content across multiple client devices 1806 associated with one or more users. For example, a user may edit digital content using client device 1806. The content management system 1802 can cause client device 1806 to send the edited digital content to content management system 1802. Content management system 1802 then synchronizes the edited digital content on one or more additional computing devices.

In addition to synchronizing digital content across multiple devices, one or more implementations of content management system 1802 can provide an efficient storage option for users that have large collections of digital content. For example, content management system 1802 can store a collection of digital content on content management system 1802, while the client device 1806 only stores reduced-sized versions of the digital content. A user can navigate and browse the reduced-sized versions (e.g., a thumbnail of a digital image) of the digital content on client device 1806. In particular, one way in which a user can experience digital content is to browse the reduced-sized versions of the digital content on client device 1806.

Another way in which a user can experience digital content is to select a reduced-size version of digital content to request the full- or high-resolution version of digital content from content management system 1802. In particular, upon a user selecting a reduced-sized version of digital content, client device 1806 sends a request to content management system 1802 requesting the digital content associated with the reduced-sized version of the digital content. Content management system 1802 can respond to the request by sending the digital content to client device 1806. Client device 1806, upon receiving the digital content, can then present the digital content to the user. In this way, a user can have access to large collections of digital content while minimizing the amount of resources used on client device 1806.

Client device 1806 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1806 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1804.

Network 1804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1806 may access content management system 1802.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:

providing, for display via a content collection, a visual representation of gated content items associated with a user account;

generating, for display via a digital passport interface comprising a graphical interface view independent of a view of the content collection, a digital passport comprising a set of tokenized assets associated with gated content items of a user account of a content management system, wherein the gated content items are verified via network calls to protected network locations, by:

identifying a first tokenized asset associated with a first gated content item managed by a first tokenized asset system at a first protected network location accessible only to user accounts linked to the first tokenized asset;

identifying a second tokenized asset associated with a second gated content item managed by a second tokenized asset system at a second protected network location accessible only to user accounts linked to the second tokenized asset; and causing the display of the first tokenized asset and the second tokenized asset via a digital passport interface for the user account within an integrated user interface comprising simultaneously displayed visual representations of the digital passport interface together with the content collection;

receiving, via a user interaction with the digital passport interface, a request by the user account of the content management system to access the first gated content item; and determining, based on the request to access the first gated content item, that the user account is permitted to access the first protected network location of the first gated content item by detecting the first tokenized asset within the digital passport interface from the set of tokenized assets associated with the user account.

2. The method of claim 1, wherein receiving the request to access the first gated content item comprises one of:

receiving an indication from a client device that the user account is requesting access to the first gated content item maintained by the content management system; or receiving an indication from a third party content system that the user account is requesting access to the first gated content item maintained by the third party content system.

3. The method of claim 1, further comprising generating the digital passport for the user account of the content management system by:

generating links to blockchain locations for the set of tokenized assets associated with the user account; and grouping the links into a collection accessible by a single passport interface.

4. The method of claim 1, further comprising:

determining that the first gated content item is accessible to user accounts indicating ownership of the first tokenized asset within a blockchain; and wherein permitting the user account to access the first gated content item is based on determining that the user account owns the first tokenized asset.

5. The method of claim 1, further comprising:

receiving an additional request by an additional user account to access the first gated content item;

determining, based on the additional request, that an additional set of tokenized assets associated with the additional user account does not include the first tokenized asset; and preventing the additional user account from accessing the first gated content item based on determining that the additional set of tokenized assets does not include the first tokenized asset.

6. The method of claim 1, wherein receiving the request to access the first gated content item comprises receiving a request to access protected content within the content management system.

7. The method of claim 1, further comprising providing the first gated content item for display on a client device associated with the user account based on determining that the user account is associated with the first tokenized asset.

8. A system comprising:

at least one processor; and a non-transitory computer readable medium comprising instructions that, when executed by the at least one processor, cause the system to:

provide, for display via a content collection, a visual representation of gated content items associated with a user account;

generate, for display via a digital passport interface comprising a graphical interface view independent of a view of the content collection, a digital passport comprising a set of tokenized assets associated with a user account of a content management system by:

identifying, via network calls to a first protected network location, a first tokenized asset associated with a first gated content item managed by a first tokenized asset system at the first protected network location accessible only to user accounts linked to the first tokenized asset;

identifying, via network calls to a second protected network location, a second tokenized asset associated with a second gated content item managed by a second tokenized asset system at the second protected network location accessible only to user accounts linked to the second tokenized asset; and causing the display of the first tokenized asset and the second tokenized asset via a digital passport interface for the user account within an integrated user interface comprising simultaneously displayed visual representations of the digital passport interface together with the content collection;

receive, via a user interaction with the digital passport interface, a request by the user account of the content management system to access the first gated content item; and determine, based on the request to access the first gated content item, that the user account is permitted to access the first protected network location of the first gated content item by detecting the first tokenized asset within the digital passport interface from the set of tokenized assets associated with the user account.

9. The system of claim 8, further comprising instructions that, when executed by the at least one processor, cause the system to generate a digital passport for the user account of the content management system by generating a passport interface element for display on a client device associated with the user account, the passport interface element comprising one or more of:

an assets tab for organizing tokenized assets including nonfungible tokens and cryptocurrencies;

a stream tab for viewing activity from creators associated with the set of tokenized assets of the user account;

a connections tab for organizing content items and other user accounts connected to the user account via the set of tokenized assets; or an activity tab for viewing an activity history of user account behavior using the set of tokenized assets.

10. The system of claim 8, further comprising instructions that, when executed by the at least one processor, cause the system to provide, for display on a client device associated with the user account, visual representations of the set of tokenized assets associated with the user account together with tokenized asset data associated with the set of tokenized assets.

11. The system of claim 8, further comprising instructions that, when executed by the at least one processor, cause the system to:

determine internet activity from creators of the set of tokenized assets associated with the user account; and provide, for display on a client device associated with the user account, visual representations of events within the internet activity from the creators.

12. The system of claim 8, further comprising instructions that, when executed by the at least one processor, cause the system to:

determine content items and other user accounts connected to the user account via the set of tokenized assets; and provide, for display on a client device associated with the user account, visual representations of the content items and the other user accounts connected to the user account.

13. The system of claim 8, further comprising instructions that, when executed by the at least one processor, cause the system to:

monitor user account activity associated with the set of tokenized assets; and provide, for display on a client device associated with the user account, a record of the user account activity associated with the set of tokenized assets.

14. The system of claim 8, further comprising instructions that, when executed by the at least one processor, cause the system to:

receive an indication from a third party content system that the user account is requesting access to the first gated content item maintained by the third party content system; and in response to the indication from the third party content system, provide an indication to the third party content system that the user account is associated with the first tokenized asset permitting access to the first gated content item.

15. A non-transitory computer readable medium comprising instructions that, when executed by at least one processor, cause the at least one processor to:

provide, for display via a content collection, a visual representation of gated content items associated with a user account;

generate, for display via a digital passport interface comprising a graphical interface view independent of a view of the content collection, a digital passport comprising a set of tokenized assets associated with gated content items of a user account of a content management system, wherein the gated content items are verified via network calls to protected network locations, by:

identifying a first tokenized asset associated with a first gated content item managed by a first tokenized asset system at a first protected network location accessible only to user accounts linked to the first tokenized asset;

identifying a second tokenized asset associated with a second gated content item managed by a second tokenized asset system at a second protected network location accessible only to user accounts linked to the second tokenized asset; and causing the display of the first tokenized asset and the second tokenized asset via a digital passport interface for the user account within an integrated user interface comprising simultaneously displayed visual representations of the digital passport interface together with the content collection;

receive, via a user interaction with the digital passport interface, a request by the user account of the content management system to access the first gated content item; and determine, based on the request to access the first gated content item, that the user account is permitted to access the first protected network location of the first gated content item by detecting the first tokenized asset within the digital passport interface from the set of tokenized assets associated with the user account.

16. The non-transitory computer readable medium of claim 15, further comprising instructions that, when executed by the at least one processor, cause the at least one processor to provide, for display on a client device associated with the user account, gating tool options for defining tokenized gating rules of a content item associated with the user account of the content management system.

17. The non-transitory computer readable medium of claim 16, further comprising instructions that, when executed by the at least one processor, cause the at least one processor to provide the gating tool options by providing an option for indicating a specific tokenized asset required for accessing an indicated content item.

18. The non-transitory computer readable medium of claim 16, further comprising instructions that, when executed by the at least one processor, cause the at least one processor to provide the gating tool options by providing selectable options for setting quantities and timing rules associated with respective tokenized assets required for accessing an indicated content item.

19. The non-transitory computer readable medium of claim 15, further comprising instructions that, when executed by the at least one processor, cause the at least one processor to:

receive a request by the user account to access an additional gated content item;

determine that the additional gated content item comprises a collaboration content item gated by a first tokenized asset set by a first user account and a second tokenized asset set by a second user account; and based on the request to access the additional gated content item, determine that the user account is associated with the first tokenized asset and the second tokenized asset permitting the user account access to the additional gated content item.

20. The non-transitory computer readable medium of claim 15, further comprising instructions that, when executed by the at least one processor, cause the at least one processor to receive the request to access the first gated content item by receiving a request to access one or more of a website with tokenized gate access, a folder with tokenized gate access, a content collection with tokenized gate access, or an individual content item with tokenized gate access.

* * * * *